(12) United States Patent
Norota

(10) Patent No.: US 12,229,596 B2
(45) Date of Patent: Feb. 18, 2025

(54) METHOD OF STORING ELECTRONIC DATA, RESOURCE RESERVATION SYSTEM, AND TERMINAL APPARATUS

(71) Applicant: Ken Norota, Kanagawa (JP)

(72) Inventor: Ken Norota, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 628 days.

(21) Appl. No.: 17/305,193

(22) Filed: Jul. 1, 2021

(65) Prior Publication Data

US 2022/0019472 A1  Jan. 20, 2022

(30) Foreign Application Priority Data

Jul. 15, 2020  (JP) ................................ 2020-121727

(51) Int. Cl.
*G06F 9/50* (2006.01)
*G06Q 10/02* (2012.01)
*H04L 12/18* (2006.01)

(52) U.S. Cl.
CPC ........... *G06F 9/5027* (2013.01); *G06Q 10/02* (2013.01); *H04L 12/1818* (2013.01); *H04L 12/1822* (2013.01)

(58) Field of Classification Search
CPC ...... G06F 9/5027; G06Q 10/02; G06Q 10/10; G06Q 10/109; H01L 12/1818; H01L 12/1822
See application file for complete search history.

(56) References Cited

U.S. PATENT DOCUMENTS

| | | | |
|---|---|---|---|
| 11,496,604 B2* | 11/2022 | Suzuki | H04L 63/02 |
| 2013/0298134 A1* | 11/2013 | Jackson | G06F 9/5072 718/104 |
| 2014/0036299 A1 | 2/2014 | Norota | |
| 2015/0212769 A1 | 7/2015 | Norota et al. | |
| 2015/0222785 A1 | 8/2015 | Norota | |
| 2016/0269576 A1 | 9/2016 | Norota | |
| 2018/0309742 A1 | 10/2018 | Kato | |
| 2020/0118045 A1* | 4/2020 | Chung | G06Q 10/06314 |
| 2020/0174732 A1 | 6/2020 | Katsuragi | |

FOREIGN PATENT DOCUMENTS

| | | |
|---|---|---|
| JP | 2010-073135 | 4/2010 |
| JP | 2017-112490 | 6/2017 |
| JP | 2018-185807 | 11/2018 |
| JP | 2020-087283 | 6/2020 |

OTHER PUBLICATIONS

Japanese Office Action for 2020-121727 mailed on Jan. 9, 2024.

* cited by examiner

*Primary Examiner* — Dylan C White
(74) *Attorney, Agent, or Firm* — IPUSA, PLLC

(57) ABSTRACT

A method of storing electronic data performed by a terminal apparatus communicable with an information processing terminal is provided. The method includes: receiving, during a use of a first resource, a notification indicating that reservation of a second resource selected by a user is completed, from the information processing terminal; and in response to receiving the notification indicating that the reservation of the second resource is completed, starting a storing process of storing electronic data output by an electronic device during the use of the first resource.

12 Claims, 21 Drawing Sheets

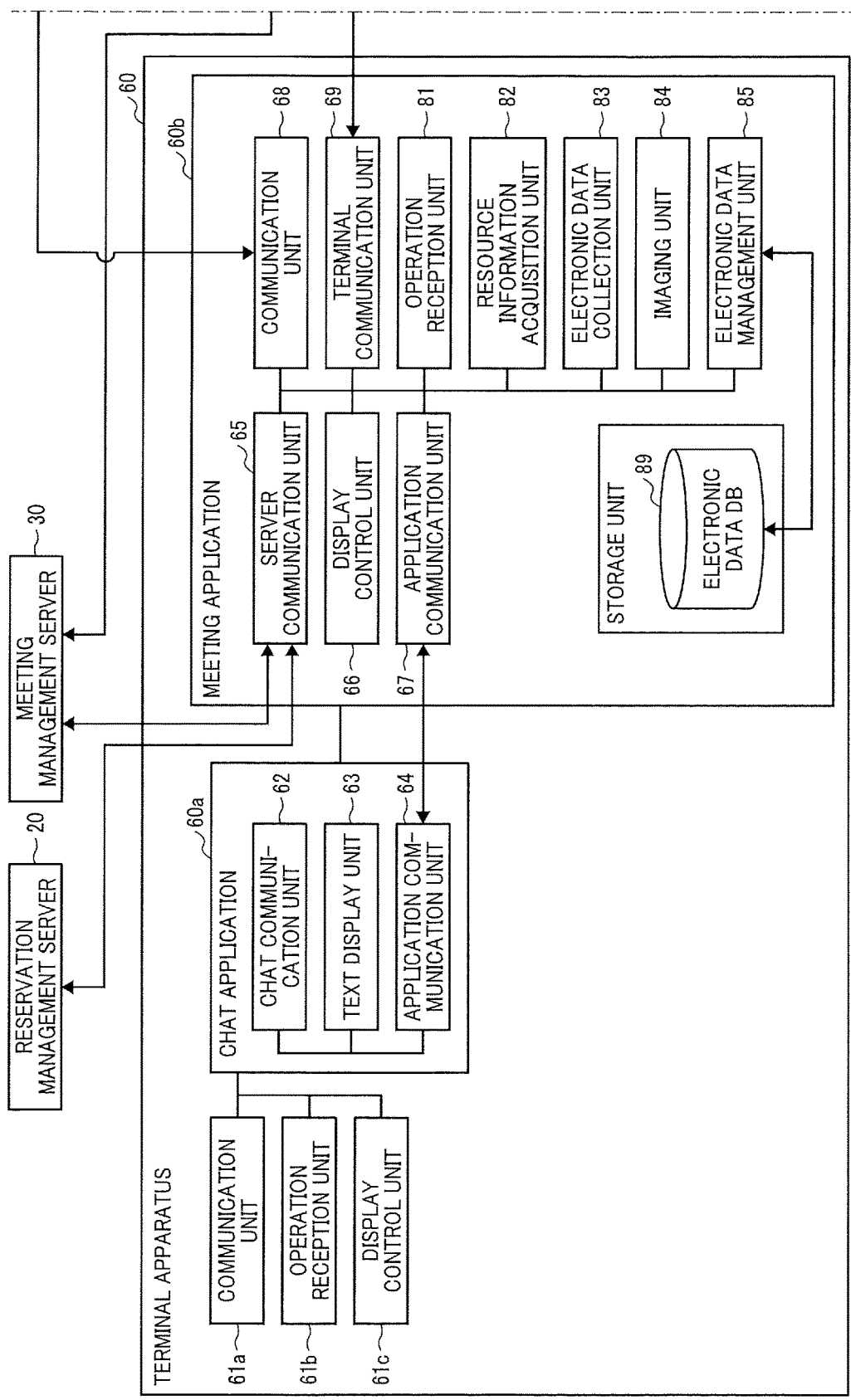
FIG. 7A  FIG. 7 | FIG. 7A | FIG. 7B |

FIG. 8

| a@xfood.com | MONDAY | TUESDAY | WEDNESDAY | THURSDAY | FRIDAY | SATURDAY | SUNDAY |
|---|---|---|---|---|---|---|---|
| 7:00 | | | | | | | |
| 8:00 | | | | | | | |
| 9:00 | | | | | | | |
| 10:00 | | ←MEETING NAME: REGULAR MEETING PARTICIPANTS: MR.A; MR.B DOCUMENT: siryo.ppt→ | | | | | |
| 11:00 | | | | | | | |
| 12:00 | | | | | | | |
| 13:00 | | | | | | | |
| 14:00 | | | | ←OUT OF OFFICE | | | |
| 15:00 | | | ←MEET VISITOR→ | | | | |
| 16:00 | | | | | | | |
| 17:00 | | | | → | | | |
| 18:00 | | | | | | | |
| 19:00 | | | | | | | |
| 20:00 | | | | | | | |
| 21:00 | | | | | | | |
| 22:00 | | | | | | | |

METHOD OF STORING ELECTRONIC DATA, RESOURCE RESERVATION SYSTEM, AND TERMINAL APPARATUS

CROSS-REFERENCE TO RELATED APPLICATIONS

This patent application is based on and claims priority pursuant to 35 U.S.C. § 119(a) to Japanese Patent Application No. 2020-121727, filed on Jul. 15, 2020, in the Japan Patent Office, the entire disclosure of which is hereby incorporated by reference herein.

BACKGROUND

Technical Field

Embodiments of the present disclosure relate to a method of storing electronic data, a resource reservation system, and a terminal apparatus.

Related Art

A resource reservation system for reserving resources including assets such as meeting rooms is known. In a general-purpose resource reservation system, a user operates a terminal apparatus connected to a reservation management server through a network to reserve a resource such as a meeting room. When the resource is a meeting room, an information processing terminal located in the meeting room communicates with an information processing apparatus (server) to display the schedule, place, etc. of a meeting. The user uses the meeting room by inputting a start of use of the reserved meeting room to the information processing terminal. When the user is to end using the meeting room, the user inputs an end of use of the meeting room to the information processing terminal.

SUMMARY

According to one or more embodiments, a method of storing electronic data performed by a terminal apparatus communicable with an information processing terminal is provided. The method includes: receiving, during a use of a first resource, a notification indicating that reservation of a second resource selected by a user is completed, from the information processing terminal; and in response to receiving the notification indicating that the reservation of the second resource is completed, starting a storing process of storing electronic data output by an electronic device during the use of the first resource.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 7A and 7B (FIG. 7) are block diagrams illustrating an example of functional configurations of the terminal apparatus and the meeting room terminal, according to an embodiment of the present disclosure;

FIG. 8 is a diagram illustrating an example of a user schedule stored in a user schedule database (DB), according to an embodiment of the present disclosure;

Figure 1:
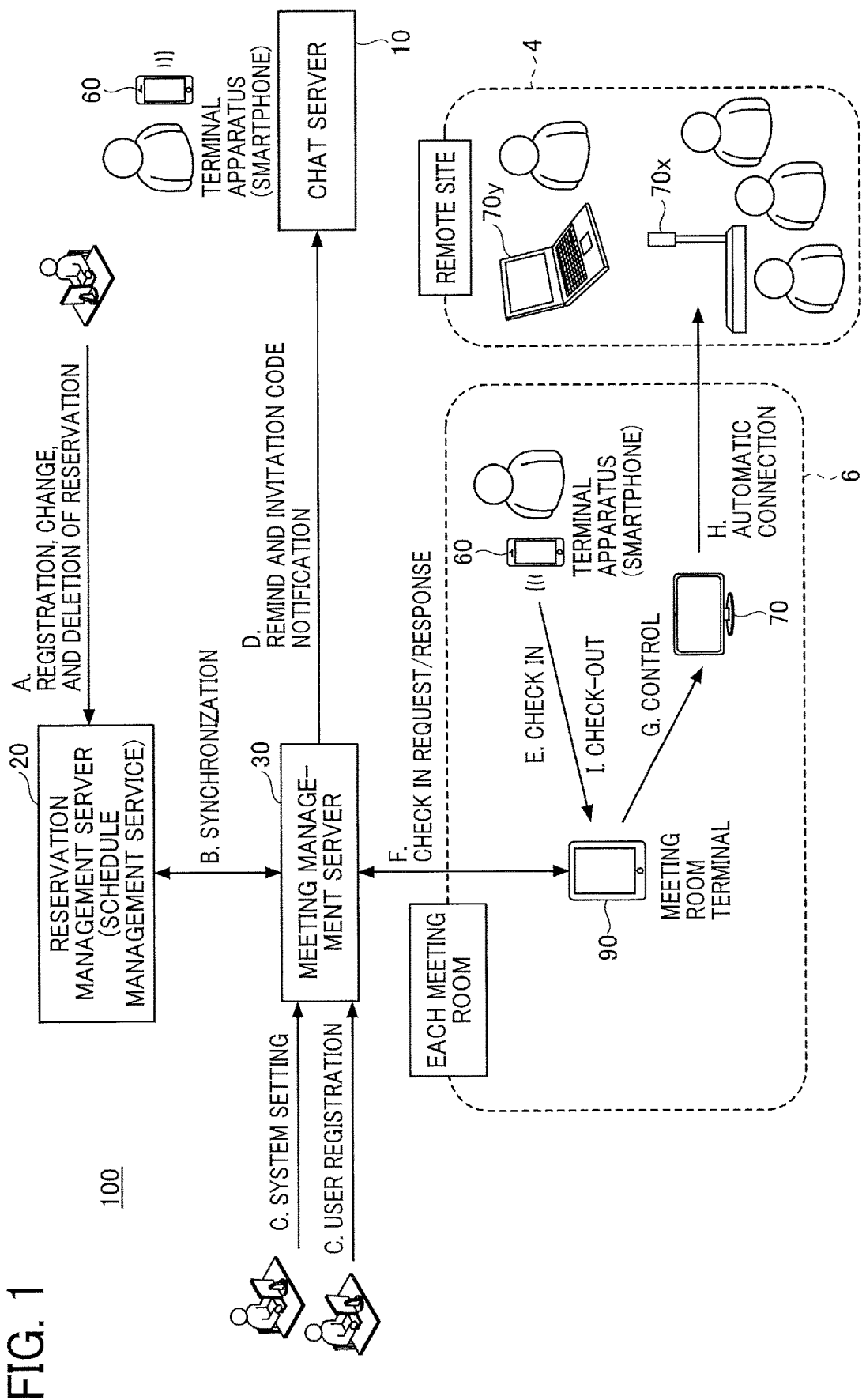
FIG. 1 is a schematic diagram illustrating an overview of operation performed by a facility reservation system, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of a facility reservation system, a terminal apparatus, and a method of storing electronic data performed by the terminal apparatus, according to an example embodiment of the present disclosure.

Overview of Facility Reservation System:

An overview of a facility reservation system 100 is described with reference to FIG. 1. FIG. 1 is a schematic diagram illustrating an overview of operation performed by the facility reservation system 100.

A. A user who is to make a reservation operates his or her terminal apparatus to communicate with a reservation management server 20, whereby reserving a meeting room. The user who makes a reservation may be referred to as a "reservation-making user", hereinafter. The reservation management server 20 is implemented by a general-purpose cloud service such as Office365 (registered trademark) and G Suite (registered trademark). In the reservation management server 20, meeting rooms of an organization such as a company to which the reservation-making user belongs are registered.

B. A meeting management server 30 is a server that controls entire operation of the facility reservation system 100 based on reservation statuses of the meeting rooms. The meeting management server 30 communicates with the reservation management server 20 at suitable timings to acquire reservation information, so that the reservation information is synchronized between the meeting management server 30 and the reservation management server 20.

C. An administrator or the like of the organization or the facility reservation system 100 performs user registration and configures various settings to the meeting management server 30. For example, the user registration refers to registering a user to whom various notifications are to be transmitted by a chat server 10 such as Slack (registered trademark), Line (registered trademark), and Microsoft Teams (registered trademark). Further, since the notifications are sent by a bot that transmits a message as the meeting management server 30, the bot provided by the chat server 10 is also registered. Examples of the various settings configured by the administrator or the like to the meeting management server 30 include registration of a meeting room terminal 90 and a setting of a timing when a reminder is to be sent.

D. When the current time is a fixed time period before the start time of a meeting defined in the reservation information, the meeting management server 30 sends a reminder of the scheduled meeting to the reservation-making user. This reduces or prevents an empty reservation. The term "empty reservation" refers to reserving resources such as the meeting room that is not actually to be used. Further, the meeting management server 30 transmits a notification indicating an invitation code (meeting identification information) to the user as needed. The reservation-making user receives the reminder, and then stores, in the terminal apparatus 60, the invitation code for checking in the meeting room.

E. The meeting room terminal 90 (an example of an information processing terminal) is provided in each meeting room 6, and the meeting room terminal 90 periodically downloads reservation information for meetings conducted in the corresponding meeting room. The meeting room terminal 90 displays a schedule of the meetings to be conducted on the current day or a schedule of an upcoming meeting, thereby allowing participants to confirm the schedule. In another example, one meeting room terminal 90 is provided for a plurality of meeting rooms. The reservation-making user for the meeting room enters the meeting room 6 a little before the start time of the meeting to check in. For example, the reservation-making user checks in by inputting the meeting identification information to the meeting room terminal 90, or by holding the terminal apparatus 60 over the meeting room terminal 90 (to cause the meeting room terminal 90 to read the meeting identification information, or cause the terminal apparatus 60 to communicate with the meeting room terminal 90, etc.). Such an operation is called a check-in operation, and the check-in operation is an operation to start using the meeting room.

F. The meeting room terminal 90 transmits a check-in request (usage start request) to the meeting management server 30, and when the meeting room terminal 90 is authenticated with the meeting identification information, the meeting room terminal 90 receives from the meeting management server 30 a response indicating that the check-in has succeeded. The meeting room terminal 90 displays that the meeting room is being used for a meeting (in use). In a case in which the meeting management server 30 does not confirm the check-in by a preset time before or after the start time of the meeting, the meeting management server 30 cancels the reservation of the meeting room 6 (automatic cancellation). Further, the meeting management server 30 transmits, to the meeting room terminal 90, information indicating the reservation is canceled as a status included in the reservation information. In this case, since the meeting room terminal 90 displays information indicating that the meeting room is vacant, any user can use the meeting room 6.

G. The meeting room terminal 90 controls an electronic device 70 in response to a request from the meeting management server 30. For example, the meeting room terminal 90 controls the electronic device 70 so that the power is turned on at the start time of the meeting or when checking in and turned off at the end time of the meeting or when checking out. This improves convenience for the meeting participants in operating the electronic device 70.

H. For example, in a case in which the electronic device 70 includes a videoconferencing function, the electronic device 70 communicates with an electronic device such as a videoconferencing terminal 70x at a remote site 4 to conduct a meeting (videoconference). Note that a personal computer (PC) 70y on which an application operates can also communicate with the electronic device 70. The reservation information includes destination information (communication identifier (ID) of a communication destination) indicating the remote site 4 in advance. The electronic device 70 automatically communicates with the videoconferencing terminal 70x and the PC 70y by using the destination information.

I. When the reservation-making user ends the meeting, the user presses a button of the meeting room terminal 90 to check out. The meeting room terminal 90 displays the next reservation status. This allows any user to check the reservation status of the meeting room.

Example of Use Case:

There is a case where a user checks in to a meeting room and starts a meeting as described above with reference to FIG. 1 and the meeting takes a longer time than scheduled and does not end by an end time of the reservation of the meeting room. In such case, the user wants to continue the meeting in a different meeting room immediately, if possible.

In the present embodiment, the meeting management server 30 proposes a new meeting room to the meeting room terminal 90 a little before the end time, thereby allowing the user to operate the meeting room terminal 90 to reserve a next meeting room. The meeting management server 30 reserves a new meeting room and transmits a notification indicating a completion of the reservation to the meeting room terminal 90. The meeting room terminal 90 transmits a notification indicating the completion of the reservation to the terminal apparatus 60 operated by the user. A meeting application operating on the terminal apparatus 60 starts a storing process of electronic data used in the meeting, in response to receiving the notification indicating the completion of the reservation.

The meeting application accesses the reservation management server 20 for a schedule of the user, to acquire reservation information (a date and time, a meeting name, and an attached document) of the meeting in which the user participates based on the current time. When the user selects to save electronic data (including handwritten characters, drawings, etc.) displayed on the electronic device 70, the meeting application requests the electronic device 70 to acquire an image, and acquires the electronic data displayed on the electronic device 70. In addition to or in alternative to the above, the user photographs an image of a screen of the electronic device 70 with a camera. The meeting application stores the acquired set of electronic data in the terminal apparatus 60 in association with the reservation information. This enables the electronic device 70 to display electronic data used in the past meeting at the time of check-in.

When the user succeeds in checking in to the next meeting room, the meeting application operating on the terminal apparatus 60 transmits a list of meeting names included in the reservation information stored in the terminal to the meeting room terminal 90. The meeting name is an example of an event name. The meeting room terminal 90 displays the list of meeting names to receive a selection of a desired meeting whose electronic data is to be reproduced from the user. When the user selects the desired meeting, the meeting room terminal 90 displays a list of electronic data stored in the meeting and receives a selection of desired electronic data by the user. The meeting room terminal 90 acquires the corresponding electronic data from the terminal apparatus 60 and transmits the acquired electronic data to the electronic device 70. This enables the electronic device 70 to display the electronic data previously used in a regular meeting or the like.

As described heretofore, the facility reservation system 100 according to the present embodiment starts storing electronic data used in a meeting in response to receiving information indicating the completion of the reservation by the meeting application operating on the terminal apparatus 60. This reduces or prevents the user's failure to store the electronic data.

Conventionally, the user has to search for a location where the electronic data stored each time the user is to restart the meeting at a different place. By contrast, in the present embodiment, the terminal apparatus collects and temporarily stores the electronic data used in the meeting room. When the user checks in to a different meeting room, the terminal apparatus 60 controls the electronic device 70 to reproduce the temporarily stored electronic data provided in the meeting room.

Terms Used in the Disclosure:

The term "facility" refers to an example of resources including assets to be reserved. Examples of resources include, but are not limited to, meeting rooms, equipment that can be used in the meeting rooms, apparatuses, persons, company cars, bicycles, locations such as parking lots, bicycle parking lots, free addresses, desks, or booths, rooms such as houses or apartments, remote meeting systems, printing services, and mechanisms. In the description of the present embodiment, for the sake of explanatory convenience, the term "meeting room" is used as an example of the facility. In addition, as examples of resources, various electronic devices, parking lots, rental offices, rental studios, rental cycles, rental cars (sharing cars), accommodation facilities such as hotels, various facilities such as entertainment venues, rental lockers, and rental spaces are included.

The facility reservation system described in the embodiment is an example of a resource reservation system, and a target to be reserved can be replaced with any resource other than the facility.

A meeting room from which the user checks out is an example of a first resource, and a meeting room to which the user checks in is an example of a second resource. The meeting room from which the user checks out and the meeting room to which the user checks in can be the same meeting room.

The term "reservation-making user" refers to a person who reserves a meeting room. The term "participant" is a person who participates in a meeting, or a conference. The reservation-making user is usually included in the participants. However, the reservation-making user is not necessarily included in the participants. In the present embodiment, work performed by the reservation-making user can be performed by the participant. Persons who use a meeting room are simply referred to as users.

The term "check-in" refers to that the meeting management server 30 receives a request to start using a facility, and the user is allowed to start using the facility. In general, in order for the check-in to be permitted, the meeting management server 30 needs to confirm that the person is a legitimate reservation-making user or participant. From the user's point of view, when the user can check-in, it means that the user is allowed to use the facility.

The term "check-out" refers to that the meeting management server 30 receives the end of use, extinguishes the right to use the facility granted to the user, and release the facility.

Electronic data output during the use of the facility is data on the user side output from the start to the end of the usage of the facility. Examples of the electronic data output during the use of the facility includes, but are not limited to, electronic data displayed during the use of the facility, electronic data created during the use of the facility, electronic data recorded during the use of the facility, and electronic data referred during the use of the facility. The electronic data output during the use of the facility is output, for example, in the meeting room, regardless of device or operation. The electronic data output during the use of the facility does not have to include electronic data output by the facility reservation system such as reservation information because the electronic data is on the user side, but the electronic data output by the facility reservation system may be included. Examples of the electronic data includes, but are not limited to, data of characters, drawings, etc. handwritten on the display of the electronic device 70 or a user terminal, voice data by speech, a file or web page viewed by the electronic device or the terminal apparatus, and meeting minutes generated from these data. In the present embodiment, such electronic data is simply described by the term "used electronic data".

The reservation information is information for managing the reservation status (reservation schedule) of the facility and indicates at least from when to when the reservation is made. The reservation information can further include information on a reservation-making user, a meeting name, an expected participant, and equipment such as a projector.

The term "information for displaying electronic data" refers to information required to display the electronic data on the user's terminal or a device provided in the facility. The information for displaying the electronic data includes, but are not limited to, the electronic data itself and a storage location such as a uniform resource locator (URL).

Figure 2:
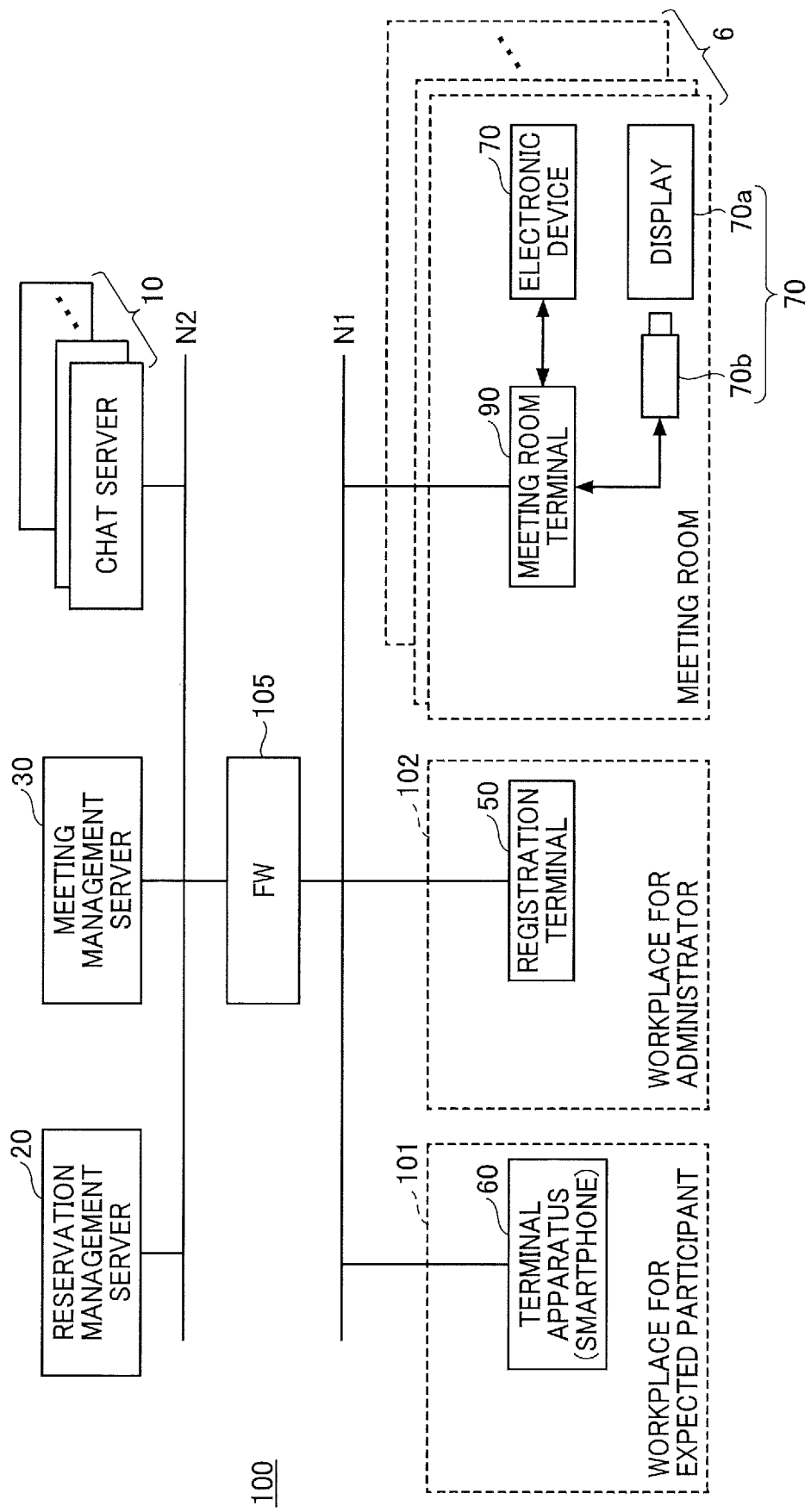
FIG. 2 is a block diagram illustrating an example of a system configuration of the facility reservation system, according to an embodiment of the present disclosure.

Example of System Configuration:

FIG. 2 is a block diagram illustrating an example of a system configuration of the facility reservation system 100. The facility reservation system 100 is divided into an external network N2 and an intra-company network N1. The intra-company network N1 is an internal network, which is a network inside a firewall 13, and the external network N2 is a network such as the Internet through which unspecified volume of communication is transmitted.

The reservation management server 20, the meeting management server 30, and one or more chat servers 10 are connected to the external network N2. The servers communicate with one another as needed. Further, the terminal apparatus 60 operated by a participant attending a meeting can be connected to the external network N2 as needed.

The reservation management server 20 is implemented by one or more information processing apparatuses (a computer system), each being installed with a general-purpose server operating system (OS), for example. The reservation management server 20 is an example of an information processing apparatus in the claims. A system relating to the reservation of a facility, provided by the reservation management server 20, is referred to as a reservation management system. The reservation management server 20 includes a calendar system and provides a web application for managing various schedules. Specifically, the web application provides the following functions, for example:

To accept schedule registration, and enable a reservation-making user to confirm the reservation from anywhere at any time;

To send a reminder email at the preset date and time, such as 30 minutes before the scheduled time;

To enable one person to manage schedules using plural calendars (for business, for private, etc.);

To share a calendar with users belonging to the same group.

The reservation management server 20 manages users by accounts. The term "account" refers to a right of a user to use a service. In many systems, the user logs in to a system using the account. For this reason, the account has a function (function of identification information) to enable the system to uniquely identify the user. In the present embodiment, the reservation management server 20 transmits reservation information of the account (domain) registered in advance to the meeting management server 30. Alternatively, the meeting management server 30 requests the reservation information with designation of the account of the reservation management server 20, to acquire the reservation information of the meeting room 6 from the reservation management server 20. The account can be any suitable information based on which a user can be uniquely identified. Examples of the account include an email address, an ID, and a telephone number.

Although in the present embodiment, a description is given of an example in which the reservation management server 20 manages the reservation of each meeting room 6 as a schedule, the reservation management server 20 is configured to manage various types of schedules in addition to the reservation of each meeting room 6. The reservation management server 20 can be used for reservations for various types of facilities other than each meeting room 6, such as a reservation for rental of various electronic devices, a reservation for a parking lot, a rental office, a rental studio, a rental bicycle, a rental car, accommodation facilities such as hotels, a rental space such as event venues and lockers. In addition, the meeting room in the company is just an example. In another example, the meeting room is in hospitals, local government's facilities, commercial facilities, apartments, etc.

Although G Suite (registered trademark), Office 365 (registered trademark), and the like are known as the reservation management system, any other suitable reservation management system having functions described in the present embodiment will suffice.

Further, in the present embodiment, information relating to the one or more meeting rooms 6 within the intra-company network N1 is registered in advance in the reservation management server 20. In other words, the web application of the reservation management server 20 is customized according to a meeting room name, a meeting room ID, a reservation available time, a capacity of each meeting room 6, a unit of reservation and the like of each meeting room 6 residing within the intra-company network N1 of a company using the facility reservation system 100. Accordingly, each meeting room 6 of the company using the facility reservation system 100 is associated with the reservation information.

The chat server 10 is implemented by one or more information processing apparatuses (computer system), each being installed with a general-purpose server OS, for example. A sharing system provided by the chat server 10 for sharing information such as text, audio, and video between plural users in real time is referred to as a chat system. The chat server 10 notifies the terminal apparatus 60 of information on the reservation of the meeting room 6. In the present embodiment, the facility reservation system 100 can include a plurality of chat servers 10 operated by different entities respectively.

The information to be shared includes image data, audio data, etc., in addition to text. In the present embodiment, a description is given of an example case in which text is mainly used for the notification, for the sake of explanatory convenience. For example, the chat system can provide a voice chat function through which members in a group have a communication with each other. The voice chat can be a one-to-one voice chat or a one-to-N voice chat, where $N \geq 2$. In other words, according to the present embodiment, the chat system notifies the information on the reservation of the meeting room 6 by outputting a voice message, in addition to or in alterative to, displaying text. LINE (registered trademark), Slack (registered trademark), Microsoft Teams (registered trademark) and the like are known as chat systems, but any suitable chat system having a capability of transmitting notification to one or more users from a bot (a program that executes predetermined processes) will suffice.

The chat server 10 also manages a user by using an account, which is different from the account of the reservation management server 20. The meeting management server 30 is not basically required to recognize the account of the chat server 10. However, the meeting management server 30 can transmit a notification by designating a desired account of the chat server 10.

The meeting management server 30 is implemented by one or more information processing apparatuses (computer system), each being installed with a general-purpose server OS, for example. The meeting management server 30 is an example of an information processing apparatus included in a system in the claims. As processing relating to the external network N2, the meeting management server 30 acquires the reservation information of the meeting room 6 from the reservation management server 20. Further, the meeting management server 30 acquires an expected participant set in the reservation information and transmits, at a preset time, a notification to the group of the chat server 10 (or to an individual user such as a reservation-making user) associated with the acquired expected participant. As processing relating to the intra-company network N1, the meeting management server 30 manages a check-in and a check-out to and from the meeting room 6. Further, the meeting management server 30 turns on or off the electronic device 70, based on the reservation information associated with the meeting room 6 acquired from the reservation management server 20.

An expected participant can access the external network N2 through the intra-company network N1 from various locations such as the meeting room 6, a workplace 101 for an expected participant, a workplace 102 for an administrator, and the like in the intra-company network N1. Examples of the intra-company network N1 include, but are not limited to, a local area network (LAN). The meeting room 6, the workplace 101 for an expected participant, and the workplace 102 for an administrator are not necessarily in the LAN of the same company.

In the meeting room 6, the meeting room terminal 90 and the electronic device 70 are provided. The meeting room terminal 90 and the electronic device 70 can communicate with each other through a small-scale LAN or a dedicated line. The electronic device 70 can connect to the intra-company network N1 and the external network N2 without intervening the meeting room terminal 90. The meeting room terminal 90 and the electronic device 70 can communicate with each other either wirelessly or by wire. Since the intra-company network N1 is inside the firewall 13, it is difficult to perform direct communication from the external network N2 to the intra-company network N1.

The meeting room terminal 90 is an information processing apparatus (an example of an information processing terminal) that receives operations from a meeting participant who uses the meeting room 6, such as the reservation-making user. For example, the meeting room terminal 90 is provided on a desk in the meeting room 6 or at an entrance of the meeting room 6. In one example, a plurality of the meeting room terminals 90 is provided in one meeting room 6. In another example, one meeting room terminal 90 is provided in a plurality of meeting rooms 6. The meeting room terminal 90 is implemented by one or more information processing apparatuses (computer system), each being installed with a general-purpose OS, for example.

For example, the meeting room terminal 90 transmits the meeting room ID to the meeting management server 30, to display the reservation information associated with the meeting room 6, for the current day. Furthermore, the meeting room terminal 90 acquires control information such as turning on or off the electronic device 70 from the meeting management server 30. The meeting room terminal 90 turns on or off the electronic device 70 using the acquired control information.

The meeting room terminal 90 displays a reservation status screen 300 that receives an instruction for check-in, check-out, etc. Further, the meeting room terminal 90 communicates with the meeting management server 30, to notify the meeting management server 30 of the check-in or the check-out. In response to receiving the instruction for check-in, the meeting room terminal 90 transmits, to the meeting management server 30, meeting identification information that is input by the reservation-making user and a meeting room ID that the meeting room terminal 90 stores in advance. Based on the meeting identification information and the meeting room ID transmitted from the meeting room terminal 90, the meeting management server 30 can confirm that the user who made the reservation for the meeting room 6 uses the reserved meeting room 6.

The electronic device 70 is office equipment of various types that can be used in the meeting room 6. The electronic device 70 is a facility as a reservation target as well as the meeting room 6. Examples of the electronic device 70 include, but are not limited to, an electronic whiteboard, a multifunction peripheral, a projector, a digital signage, and a digital camera. The electronic whiteboard includes a large-sized display that supports a touch panel system. The electronic whiteboard detects coordinates of a point pointed by the user on a board surface and displays a stroke by connecting the coordinates of the points. In addition, the electronic whiteboard is configured to display an image based on data output from the terminal apparatus that is connected to the electronic whiteboard. Further, the electronic whiteboard is configured to communicate with other electronic whiteboard located in a remote site to share the displayed stroke in a synchronous manner. The electronic whiteboard can be referred to as an electronic information board, etc.

The multifunction peripheral has multiple functions, such as a copier function, a scanner function, a printer function, and/or a facsimile transmitting/receiving function. The multifunction peripheral is used for printing or copying documents, scanning documents for conversion to digital data, and faxing documents during the meeting. The projector is a device that projects an image. For example, the projector projects an image (still image or moving image) displayed on a display of the terminal apparatus 60 onto a screen, etc., to enable the participants to share the image. The digital signage is a large-sized display and is used for displaying any still images or moving images. The digital camera is used by each participant to capture an image formed on paper documents or presentation materials displayed on the electronic whiteboard for storage.

In another example, the electronic device 70 is an apparatus implemented by a display 70a to which a microcomputer 70b (one or more information processing apparatuses) is attached. The microcomputer 70b communicates with the meeting room terminal 90 to turn on or off the power supply, receive information for displaying electronic data, and the like. The microcomputer 70b is also configured to communicate with the terminal apparatus 60. Accordingly, the terminal apparatus 60 can transmit screen data of documents, etc., to the microcomputer 70b, and the microcomputer 70b can control the display 70a to display the screen data. The display 70a preferably includes a touch panel, and the microcomputer 70b is configured to save data of a stroke handwritten by the user on the touch panel as electronic data. As described, the electronic device 70 may be implemented by a combination of the microcomputer 70b and the display 70a.

The terminal apparatus 60 communicable with the intra-company network N1 is provided in the workplace 101 for an expected participant. The terminal apparatus 60 can perform communication by wire or wirelessly. The terminal apparatus 60 is an information processing apparatus used when an expected participant (including a reservation-making user) reserves a meeting room. The expected participant (including the reservation-making user) can also use the terminal apparatus 60 in the meeting room. In other words, the terminal apparatus 60 is an information processing apparatus carried by the participant.

The terminal apparatus 60 is implemented by one or more information processing apparatuses (computer system), each being installed with a general-purpose OS, for example. The terminal apparatus 60 is communicable with the meeting room terminal 90. Examples of the terminal apparatus 60 include, but are not limited to, a smartphone, a tablet terminal, a PC, a personal digital assistant (PDA), a wearable PC such as smart glasses and a smartwatch. Further, the terminal apparatus 60 can be any suitable device, terminal, or apparatus, provided that the device, terminal, or apparatus includes a communication capability and browser software or application software dedicated to the chat server 10 or the reservation management server 20 operates on the device, terminal, or apparatus. For example, the terminal apparatus 60 can be a car navigation system, a game console, a television receiver, and the like.

The terminal apparatus 60 is an apparatus carried by the user, while the meeting room terminal 90 is an apparatus provided in a facility (meeting room). The terminal apparatus 60 and the meeting room terminal 90 have the same or substantially the same hardware configuration.

In the terminal apparatus 60, application software dedicated to the chat server 10 and application software dedicated to the facility reservation system 100 operate. The application software dedicated to the chat server 10 is referred to as a "chat application" hereinafter. The application software dedicated to the facility reservation system 100 is referred to as a "meeting application" hereinafter. In another example, browser software is substituted for either one or both of the chat application and the meeting application. In still another example, the meeting application of the terminal apparatus 60 has one or more functions of the meeting room terminal.

A system including the programs operating on the terminal apparatus 60 and the information processing terminal is an example of a system in the claims.

A registration terminal 50 communicable with the intra-company network N1 is provided in the workplace 102 for an administrator. The registration terminal 50 can perform communication by wire or wirelessly. The registration terminal 50 is an information processing apparatus that allows the administrator to configure initial settings in the meeting room terminal 90.

The registration terminal 50 is implemented by the similar or substantially the similar information processing apparatus(es) that is implemented as the terminal apparatus 60. However, since the registration terminal 50 is used mainly by an administrator for configuring settings to the meeting management server 30, the chat application and the meeting application are optional. The registration terminal 50 communicates with the meeting management server 30 mainly by browser software.

Figure 3:
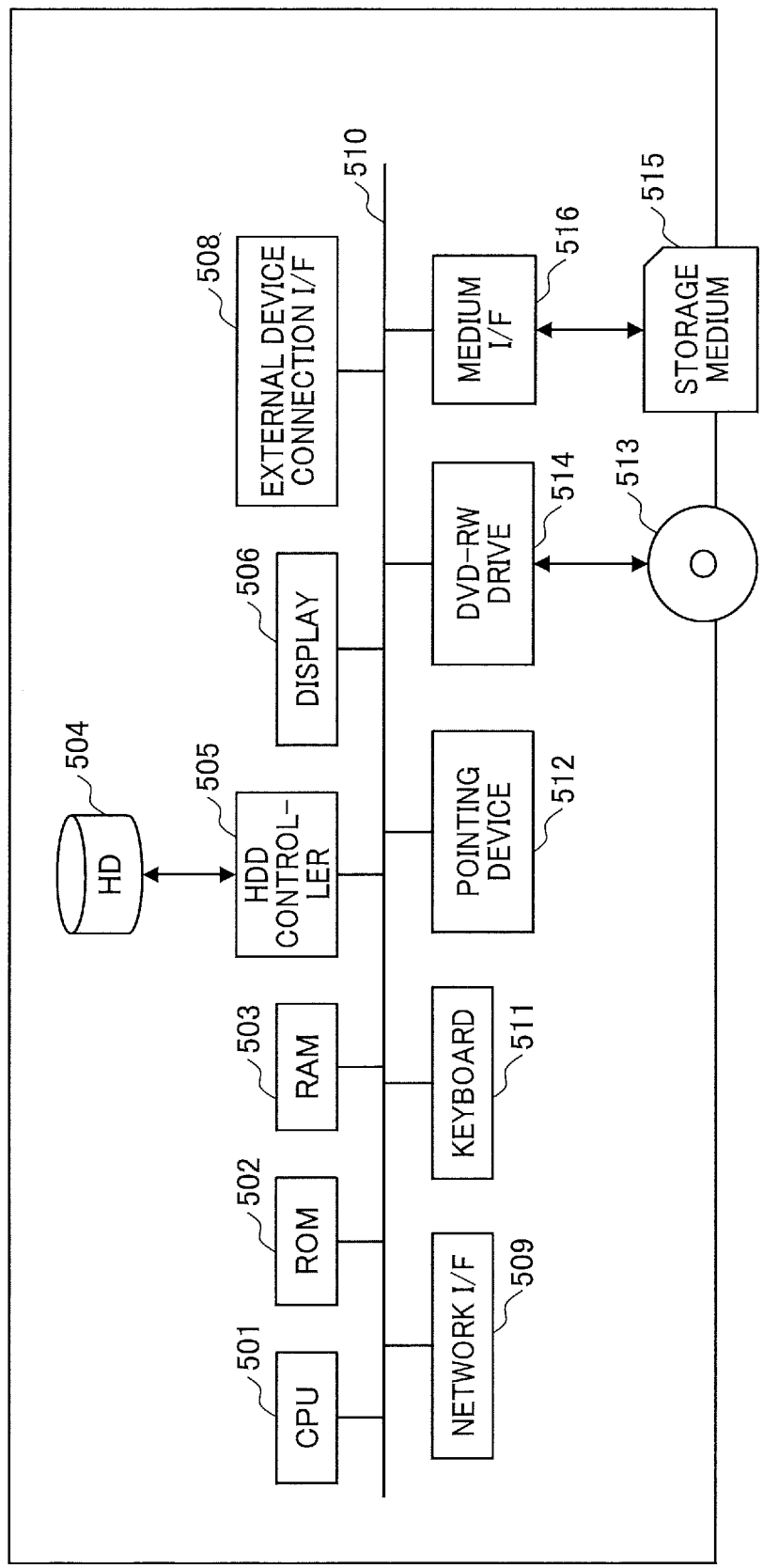
FIG. 3 is a block diagram illustrating an example of a hardware configuration of a meeting management server according to an embodiment of the present disclosure.

Hardware Configuration:
Hardware Configuration of Meeting Management Server:

FIG. 3 is a block diagram illustrating an example of a hardware configuration of the meeting management server 30. The meeting management server 30 is implemented by a computer as illustrated in FIG. 3 including a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, a digital versatile disc rewritable (DVD-RW) drive 514, and a medium I/F 516.

The CPU 501 controls entire operation of the meeting management server 30. The ROM 502 stores programs such as an initial program loader (IPL) to boot the CPU 501. The RAM 503 is used as a work area for the CPU 501. The HD 504 stores various data such as a program. The HDD controller 505 controls reading or writing of various data from or to the HD 504 under control of the CPU 501. The display 506 displays various information such as a cursor, menu, window, characters, or image. The external device connection I/F 508 is an interface that connects the meeting management server 30 to various external devices. Examples of the external devices include, but are not limited to, a universal serial bus (USB) memory and a printer. The network I/F 509 is an interface for performing data communication using a communication network. The bus line 510 is, for example, an address bus or a data bus that electrically connects the elements such as the CPU 501 illustrated in FIG. 3.

The keyboard 511 is an example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 controls reading or writing of various data from or to a DVD-RW 513, which is an example of a removable storage medium. The removable storage medium is not limited to the DVD-RW and may be a digital versatile disk-recordable (DVD-R) or the like. The medium I/F 516 controls reading or writing (storing) of data from and to a storage medium 515 such as a flash memory.

Figure 4:
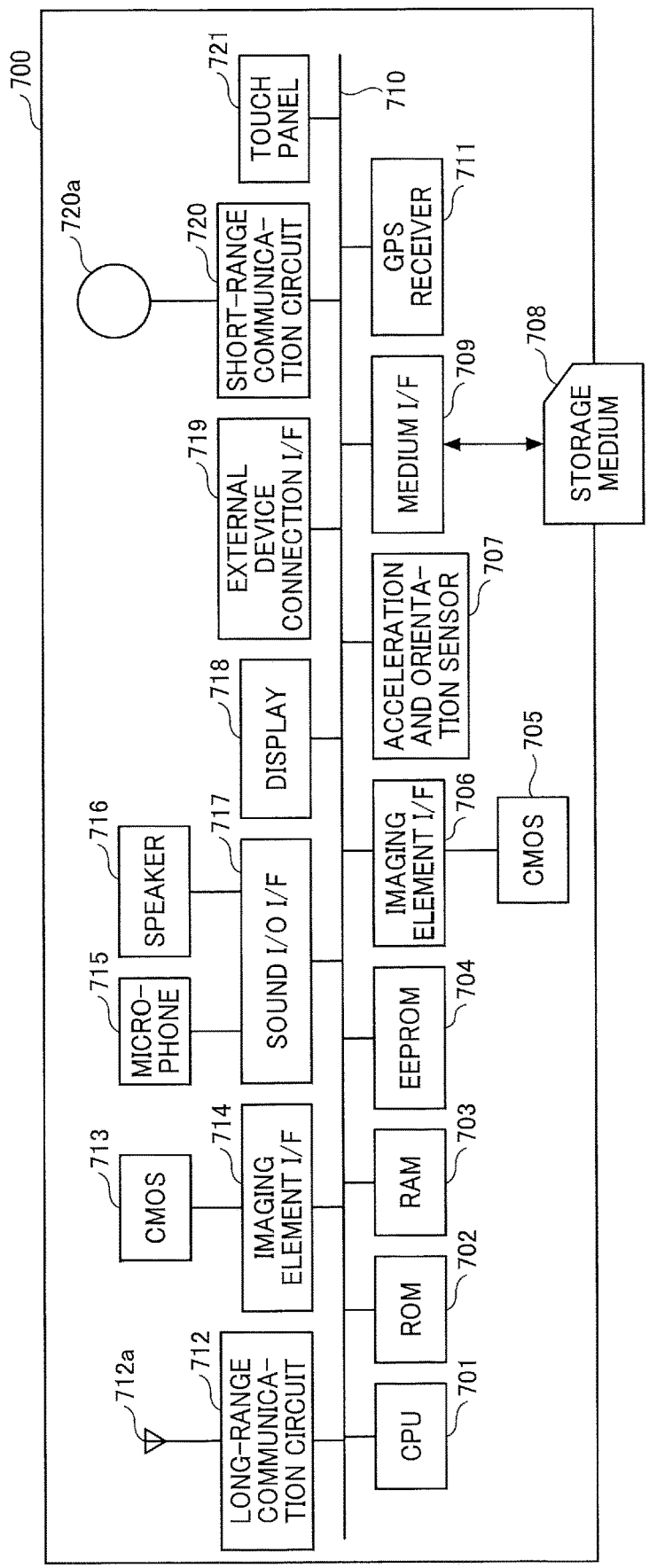
FIG. 4 is a block diagram illustrating an example of a hardware configuration of each of a meeting room terminal and a terminal apparatus, according to an embodiment of the present disclosure.

Hardware Configurations of Meeting Room Terminal and Terminal Apparatus:

FIG. 4 is a block diagram illustrating an example of a hardware configuration of each of the meeting room terminal 90 and the terminal apparatus 60. FIG. 4 illustrates a hardware configuration of a tablet apparatus, as an example of the meeting room terminal 90. As illustrated in FIG. 4, the meeting room terminal 90 includes a CPU 701, a ROM 702, a RAM 703, an electrically erasable and programmable ROM (EEPROM) 704, a complementary metal oxide semiconductor (CMOS) sensor 705, an imaging element I/F 706, an acceleration and orientation sensor 707, a medium I/F 709, and a global positioning system (GPS) receiver 711.

The CPU 701 controls entire operation of the meeting room terminal 90. The ROM 702 stores a program such as an IPL to boot the CPU 701. The RAM 703 is used as a work area for the CPU 701. The EEPROM 704 reads or writes various data such as an application under control of the CPU 701. The CMOS sensor 705 is an example of a built-in imaging device that captures an object (mainly, a self-image of a user operating the meeting room terminal 90) under control of the CPU 701 to obtain image data. In alternative to the CMOS sensor, an imaging element such as a charge-coupled device (CCD) sensor may be used. The imaging element I/F 706 is a circuit that controls driving of the CMOS sensor 705. Examples of the acceleration and orientation sensor 707 include, but not limited to, an electromagnetic compass or gyrocompass for detecting geomagnetism and an acceleration sensor. The medium I/F 709 controls reading or writing (storing) of data from or to a storage medium 708 such as a flash memory. The GPS receiver 711 receives a GPS signal from a GPS satellite.

Further, the meeting room terminal 90 includes a long-range communication circuit 712, a CMOS sensor 713, an imaging element I/F 714, a microphone 715, a speaker 716, a sound input and output (I/O) I/F 717, a display 718, an external device connection I/F 719, a short-range communication circuit 720, an antenna 720a of the short-range communication circuit 720, and a touch panel 721.

The long-range communication circuit 712 is a circuit that enables the meeting room terminal 90 to communicate with other device through the communication network. The CMOS sensor 713 is an example of a built-in imaging element that captures an object under control of the CPU 701 to obtain image data. The imaging element I/F 714 is a circuit that controls driving of the CMOS sensor 713. The microphone 715 is a built-in circuit that converts sound into an electric signal. The speaker 716 is a built-in circuit that generates sound such as music or voice by converting an electric signal into physical vibration. The sound I/O I/F 717 is a circuit for inputting or outputting an audio signal between the microphone 715 and the speaker 716 under control of the CPU 701. The display 718 is an example of a display device that displays an image of the object, various icons, etc. Examples of the display 718 include, but are not limited to, a liquid crystal display (LCD) and an organic electroluminescence (EL) display. The external device connection I/F 719 is an interface configured to connect the meeting room terminal 90 to various external devices. The short-range communication circuit 720 is a communication circuit that communicates in compliance with the near field communication (NFC) or the Bluetooth (registered trademark), for example. The touch panel 721 is an example of an input device that allows a user to operate the meeting room terminal 90 by touching a screen of the display 718.

Further, the meeting room terminal 90 includes a bus line 710. Examples of the bus line 710 include, but are not limited to, an address bus and a data bus that electrically connects the elements illustrated in FIG. 4 such as the CPU 701.

The terminal apparatus 60 has the same or substantially the same hardware configuration as that of FIG. 4. Even if the terminal apparatus 60 has a different hardware configuration, a description of the present embodiment is given under the assumption that such differences are insignificant.

Figure 5:
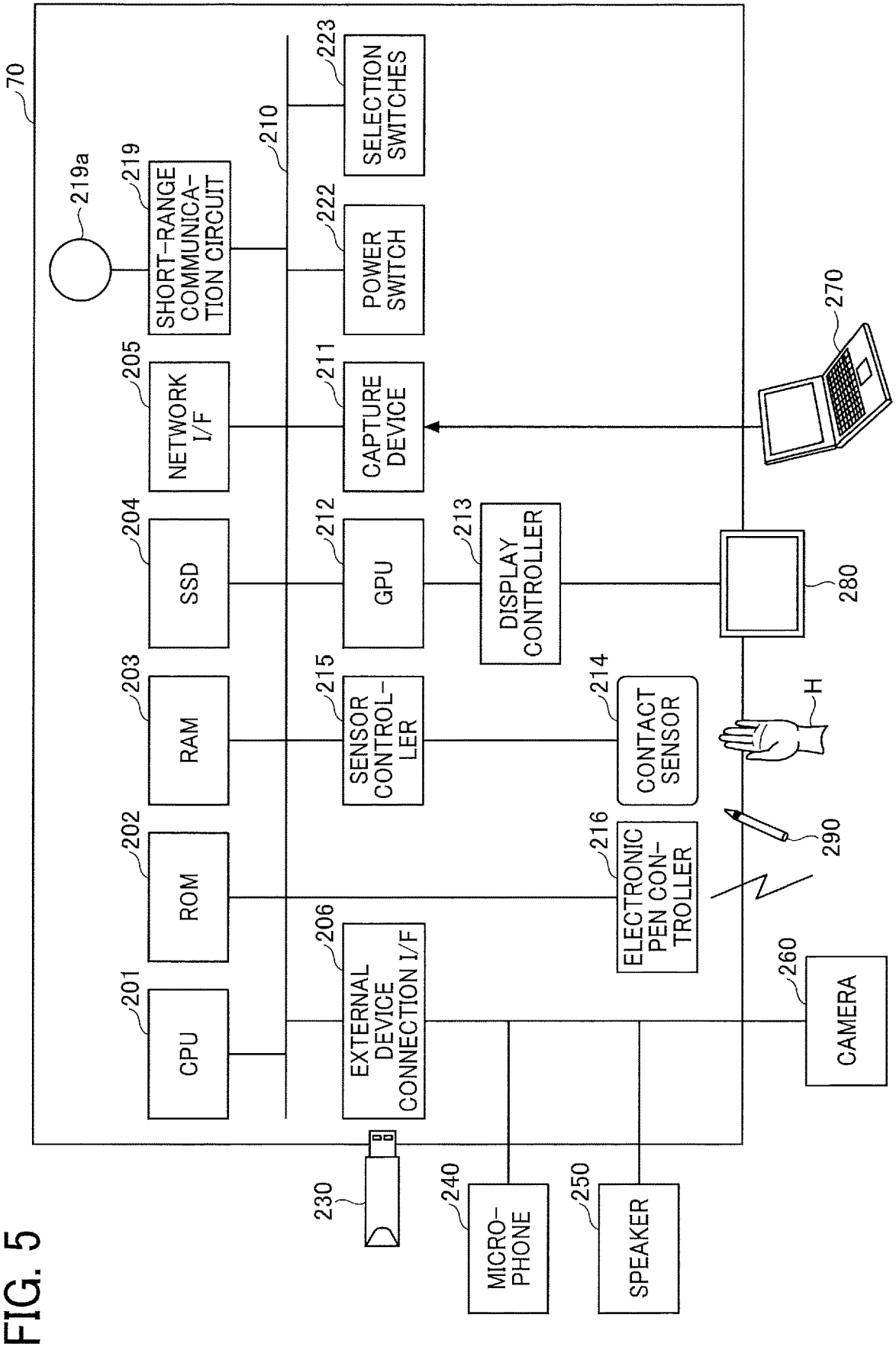
FIG. 5 is a block diagram illustrating an example of a hardware configuration of an electronic whiteboard as an example of an electronic device, according to an embodiment of the present disclosure.

Hardware Configuration of Electronic Device:

FIG. 5 is a block diagram illustrating an example of a hardware configuration of an electronic whiteboard as an example of the electronic device 70. As illustrated in FIG. 5, the electronic whiteboard includes a CPU 201, a ROM 202, a RAM 203, a solid state drive (SSD) 204, a network I/F 205, and an external device connection I/F 206.

The CPU 201 controls entire operation of the electronic whiteboard. The ROM 202 stores a control program such as the IPL to boot the CPU 201. The RAM 203 is used as a work area for the CPU 201. The SSD 204 stores various data such as a control program for the electronic whiteboard. The network I/F 205 controls communication with the communication network. The external device connection I/F 206 is an interface that connects the electronic whiteboard to various extraneous sources. Examples of the extraneous sources include, but are not limited to, a USB memory 230 and external devices (a microphone 240, a speaker 250, and a camera 260).

The electronic whiteboard further includes a capturing device 211, a graphics processing unit (GPU) 212, a display controller 213, a contact sensor 214, a sensor controller 215, an electronic pen controller 216, a short-range communication circuit 219, an antenna 219a of the short-range communication circuit 219, a power switch 222, and selection switches 223.

The capturing device 211 causes a display of an external PC 270 to display a still image or a moving image based on image data captured by the capturing device. The GPU 212 is a semiconductor chip dedicated to processing of a graphical image. The display controller 213 controls display of an image processed by the GPU 212 for output through a display 280, for example. The contact sensor 214 detects a touch onto the display 280 with an electronic pen 290 or a user's hand H. The sensor controller 215 controls operation of the contact sensor 214. The contact sensor 214 performs input of coordinates and detection of coordinates by an infrared cutoff system. More specifically, the display 280 is provided with two light receiving elements disposed on both upper side ends of the display 280, and a reflector frame surrounding the sides of the display 280. The light receiving elements emit a plurality of infrared rays in parallel to a surface of the display 280. The light receiving elements receive lights passing in the direction that is the same as an optical path of the emitted infrared rays, which are reflected by the reflector frame. The contact sensor 214 outputs an ID of the infrared ray that is blocked by an object (such as the user's hand) after being emitted from the two light receiving elements, to the sensor controller 215. Based on the ID of the infrared ray, the sensor controller 215 detects a specific coordinate that is touched by the object. The electronic pen controller 216 communicates with the electronic pen 290 to detect contact by the tip or bottom of the electronic pen with the display 280. The short-range communication circuit 219 is a communication circuit that communicates in compliance with the NFC or the Bluetooth (registered trademark), for example. The power switch 222 turns on or off the power of the electronic whiteboard. The selection switches 223 are a group of switches for adjusting brightness, hue, etc., of display on the display 280, for example.

The electronic whiteboard further includes a bus line 210. The bus line 210 is, for example, an address bus or a data bus that electrically connects the elements illustrated in FIG. 5, such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition to or in alternative to detecting a touch by the tip or bottom of the electronic pen 290, the electronic pen controller 216 may also detect a touch by another part of the electronic pen 290, such as a part held by a hand of the user.

When the electronic device 70 is implemented by the combination of the microcomputer 70b and the display 70a, a diagram illustrating a hardware configuration of the electronic device is the same or substantially the same as that of the meeting management server 30a as a general-purpose information processing apparatus of FIG. 3. Alternatively, the hardware configuration may be the same as the electronic whiteboard of FIG. 5.

Figure 6A:
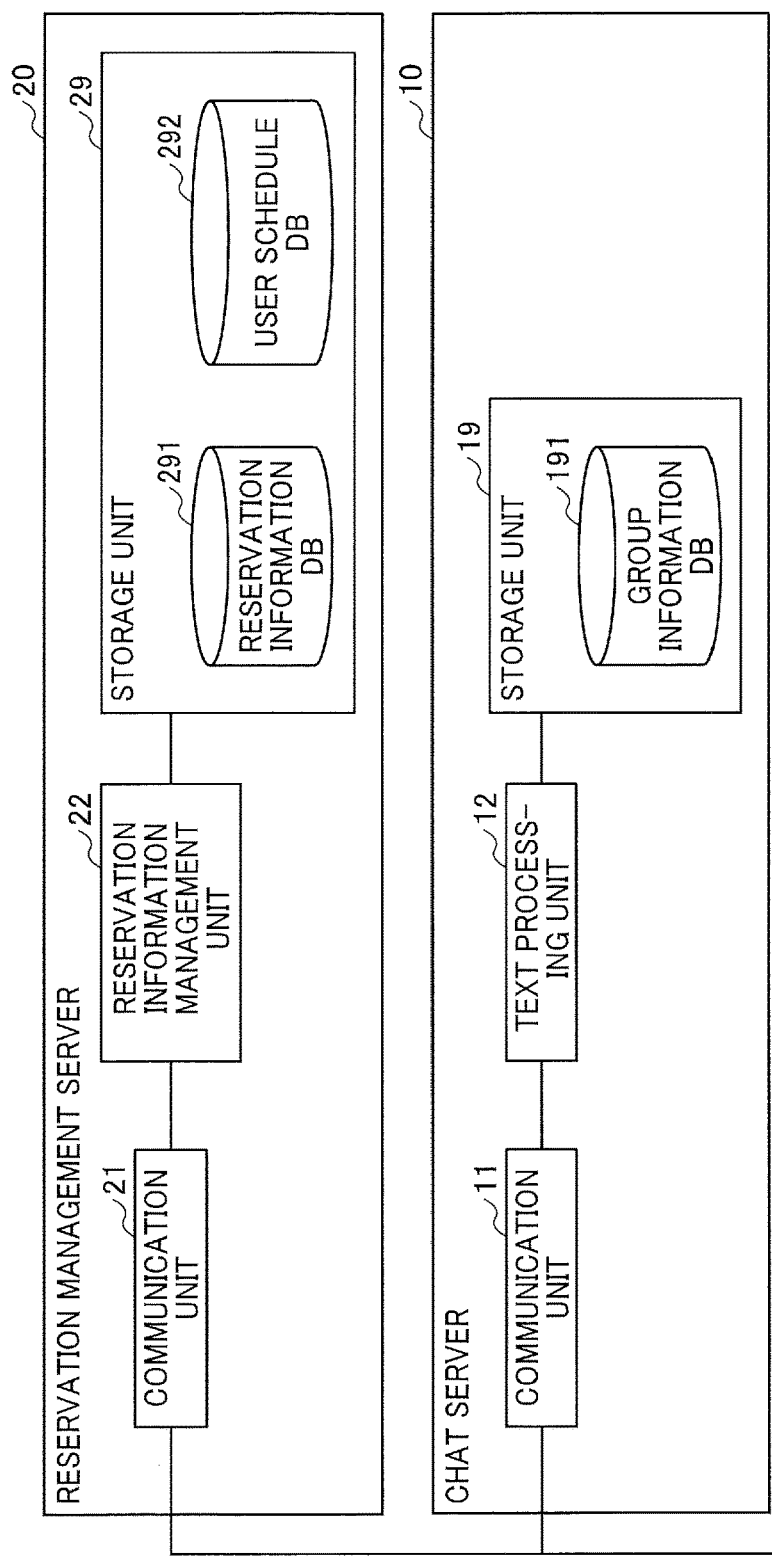
FIGS. 6A and 6B (FIG. 6) are block diagrams illustrating an example of functional configurations of a reservation management server, a chat server, and the meeting management server, according to an embodiment of the present disclosure.
Figure 6B:
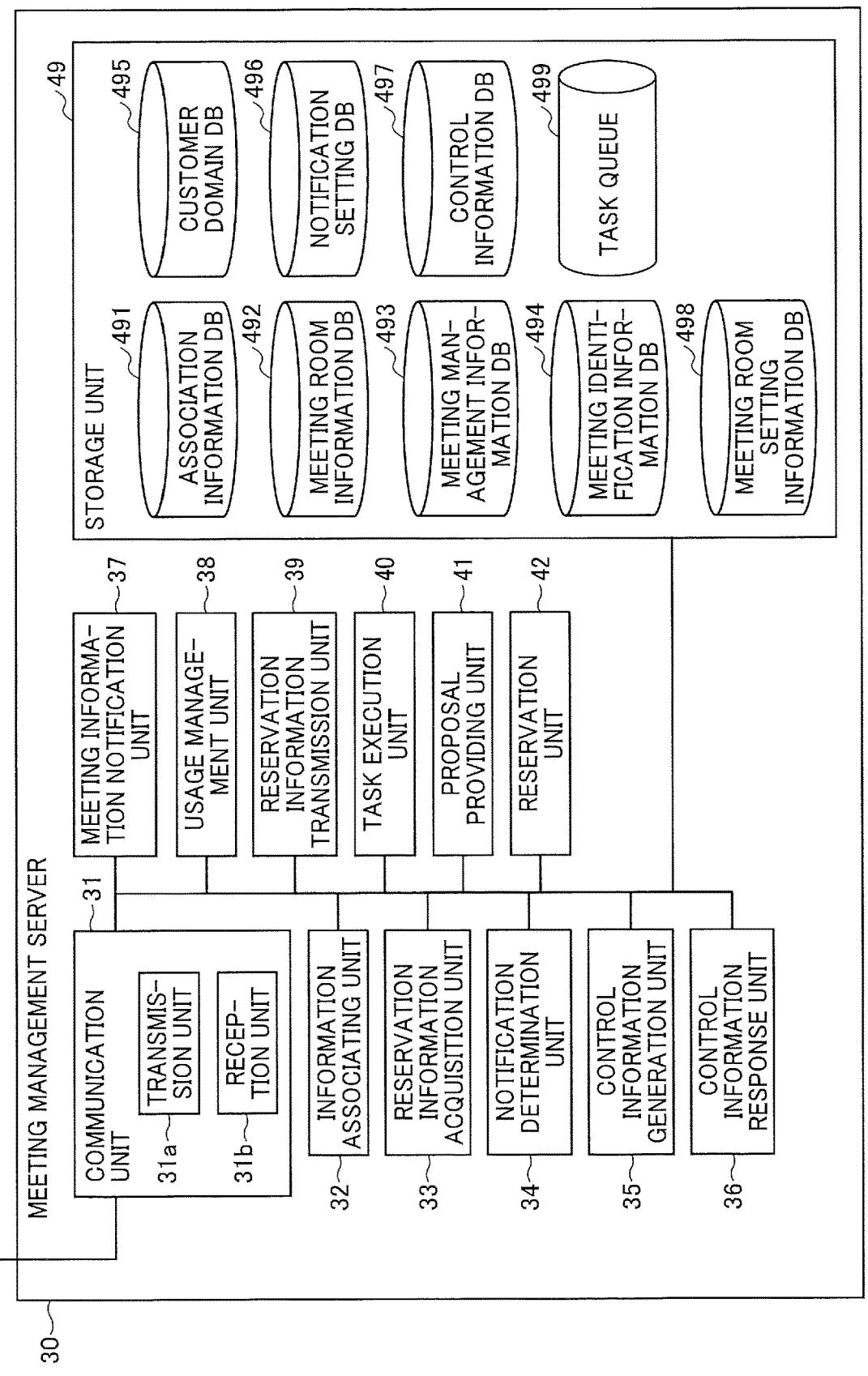

Functions:

FIGS. 6A and 6B (FIG. 6) are block diagrams illustrating an example of functional configurations of the reservation management server 20, the chat server 10, and the meeting management server 30.

Reservation Management Server:

The reservation management server 20 includes a communication unit 21 and a reservation information management unit 22. These functional units of the reservation management server 20 are functions or means that are implemented by operating one or more hardware elements illustrated in FIG. 3 in cooperation with instructions of the CPU 501 according to the program loaded from the HD 504 to the RAM 503.

The communication unit 21 transmits and receives various types of information to and from the meeting management server 30 and the terminal apparatus 60. The communication unit 21 transmits screen information of a reservation setting screen or reservation information to the terminal apparatus 60 and receives a reservation setting from the terminal apparatus 60. Further, the communication unit 21 transmits reservation information to the meeting management server 30.

The reservation information management unit 22 manages reservation information registered by a user. The reservation information management unit 22 reads the reservation information associated with the meeting room 6 requested from the meeting management server 30 from a reservation information database (DB) 291 and transmits the reservation information to the meeting management server 30 through the communication unit 21. Alternatively, when the reservation information is registered (or changed), the reservation information management unit 22 transmits the reservation information to the meeting management server 30 even if the request is not received. A general-purpose web application can be used to enable an expected participant to make a reservation to register a reservation for the meeting room 6 with the reservation management server 20.

The reservation management server 20 further includes a storage unit 29. The storage unit 29 is implemented by, for example, the RAM 503 and/or the HD 504 of FIG. 3. The storage unit 29 stores the reservation information DB 291 and a user schedule DB 292.

the meeting room 6. The reservation information includes, for each of reservation IDs, an account of reservation-making user, a meeting name, a meeting room ID, a start time of the meeting, an end time of the meeting, and accounts of expected participants in association with the reservation ID. The reservation ID is identification information for identifying one record of the reservation information. ID is an abbreviation for "identifier," and indicates an identification or identification information. ID is any one of a name, a symbol, a character string, a numerical value, or a combination of at least two of these items, which is used for identifying a particular object from among a plurality of objects. The same applies to other IDs than the reservation ID. The account of the reservation-making user is an account of an expected participant who made a reservation for the meeting room 6. The meeting name is a name of a meeting, which is given by the expected participant at his or her choice. The meeting room ID is identification information for identifying the meeting room 6 that resides on the intra-company network N1. The start time (usage start time) is the beginning of a time slot during which the meeting room 6 is reserved. In other words, the start time is a time when the meeting is to be started. The end time (usage end time) is the end of the time slot during which the meeting room 6 is reserved. In other words, the end time is a time when the meeting is to be ended. The accounts of expected participants are accounts of invited members who are scheduled to attend the meeting. Each of the accounts in Table 1 is issued by the reservation management server 20.

FIG. 8 is a schematic diagram illustrating an example of a user schedule stored in the user schedule DB 292. The user schedule is a schedule for each user. For example, when a meeting is scheduled, a start time and an end time, a meeting name, participants, a document (file) to be used in the meeting are registered on a date of calendar.

Chat Server:

The chat server 10 includes a communication unit 11 and a text processing unit 12. These functional units of the chat server 10 are functions or means that are implemented by operating one or more hardware elements illustrated in FIG. 3 in cooperation with instructions of the CPU 501 according to the program loaded from the HD 504 to the RAM 503.

The communication unit 11 transmits and receives various types of information to and from the meeting management server 30. In the present embodiment, the communication unit 11 receives, from the meeting management server 30, information on reservation of a meeting room, information for identifying the bot, and information specifying a group as a destination to which a notification is to be sent.

TABLE 1

Reservation Information DB

| Reservation ID | Reservation-making user account | Meeting name | Meeting room ID | Start time | End time | Expected participant account |
|---|---|---|---|---|---|---|
| 001 | a@xfood.com | Product Z development meeting | K-001 | Jul. 7, 2017 10:00 | Jul. 7, 2017 12:00 | b@xfood.com c@xfood.com d@xfood.com |
| 002 | e@xfood.com | Product Y development meeting | K-001 | Jul. 7, 2017 13:00 | Jul. 7, 2017 14:00 | f@xfood.com g@xfood.com |
| ... | ... | ... | ... | ... | ... | ... |

Table 1 is an example of reservation information stored in the reservation information DB 291. The reservation information is information for managing a reservation status of Examples of the information for identifying the bot include, but not limited to, a token described below. The information for identifying the bot is notified in advance as identification information of the bot from the chat server 10, when the bot of the meeting management server 30 is generated. Further, the communication unit 11 may receive information specifying an account of an individual such as a reservation-making user. Furthermore, the communication unit 11 transmits, to the meeting management server 30, information indicating that an expected participant has read the information about the reservation of the meeting room or a response made by an expected participant to the displayed information on the reservation of the meeting room.

The text processing unit 12 transmits, to the expected participants belonging to the group, information on the reservation of the meeting room 6, based on the information transmitted from the meeting management server 30, i.e., the information identifying the bot and the information identifying the group as a notification destination. The information transmitted by the text processing unit 12 appears as information provided by the bot. When a notification destination account is further specified by the meeting management server 30, the text processing unit 12 transmits information related to the reservation of the meeting room 6 to one of the expected participants belonging to the group. Accordingly, in one example, the number of notifications transmitted by the text processing unit 12 is equal to the number of the expected participants. In another example, the notification is transmitted only to a certain user such as the reservation-making user.

The text processing unit 12 is configured to send the notification as a so-called "push notification". An example of a mechanism implementing the push notification is as follows. A chat application 60a receives an ID (token) for a push notification from a server operated by a manufacturer of an OS. The server associates the token with a device (terminal apparatus 60). The chat application 60a registers the token and an account of the chat application 60a with the chat server 10. Since the chat server 10 identifies an account of the chat application 60a when sending a push notification, the token associated with the account is identified. The chat system designates the token and transmits a notification content to the server operated by the manufacturer of the OS. The server sends a push notification to a device (terminal apparatus 60) associated with the token.

The chat server 10 further includes a storage unit 19. The storage unit 19 is implemented by, for example, the RAM 503 and/or the HD 504 of FIG. 3. A group information DB 191 is stored in the storage unit 19.

space (e.g., Company A). Examples of the workspace include a URL. Alternatively, any suitable information other than the URL is used as the workspace, provided that the information is unique. Further, the workspace has plural channels according to the purposes of chatting. The channel is a group of members among whom information to be shared is exchanged, such as a group for Product A and a group for Product B. One or more members of the members belonging to the workspace belong to the channel. In other words, the notification destination is identified by the workspace and the channel. However, the notification destination is identified in different ways depending on what chat system is used for notification. Accordingly, if there is any identification information based on which a group is uniquely identified, such information can be used to identify the notification destination. In another example, three or more items of information can be used for identifying a group as the notification destination.

The channels are uniquely identified from one another. The member accounts 1 to n are accounts of members belonging to the channel. Each of these accounts is issued by the chat server 10. In the present embodiment, the bot is registered as a member for notifying other members belonging to the same group of information on the reservation of the meeting room 6. In other words, the bot is a kind of a proxy of the meeting management server 30 or a fictitious member. A comment (text) by the bot is transmitted to the terminal apparatus 60 of each of the member accounts 1 to n.

The workspace and channel are managed by the meeting management server 30. The workspace and channel are information for identifying the group to which the participant belongs.

Meeting Management Server:

The meeting management server 30 includes a communication unit 31, an information associating unit 32, a reservation information acquisition unit 33, a notification determination unit 34, a control information generation unit 35, a control information response unit 36, a meeting information notification unit 37, a usage management unit 38, a reservation information transmission unit 39, a task execution unit 40, a proposal unit 41, and a reservation unit 42. These functional units of the meeting management server 30 are functions or means that are implemented by operating one or more hardware elements illustrated in FIG. 3 in cooperation with instructions of the CPU 501 according

TABLE 2

| Group Information DB | | | | | | |
|---|---|---|---|---|---|---|
| Workspace | Channel | Member account 1 | Member account 2 | Member account 3 | Member account 4 | Bot account |
| http://sample.com/1 | #marketing | a@chat.com | b@chat.com | c@chat.com | d@chat.com | robo1@chat.com |
| http://sample.com/2 | #team1 | b@chat.com | d@chat.com | | | robo2@chat.com |
| http://sample.com/3 | #ip | f@chat.com | g@chat.com | h@chat.com | | robo3@chat.com |
| ... | ... | ... | ... | ... | ... | ... |

Table 2 is an example of group information stored in the group information DB 191. The group information is information in which accounts of members belonging to the same group are registered. In the group information, member accounts 1 to n (n=4 in Table 2) and a bot account are registered in association with a workspace and a channel.

The workspace is identification information for identifying an organization such as a company or a department. In the present embodiment, plural members belong to a workto the program loaded from the HD 504 to the RAM 503. The program is distributed from a server for program distribution or distributed as stored in a storage medium.

The communication unit 31 transmits and receives various kinds of information to and from the reservation management server 20, the chat server 10, and the terminal apparatus 60. The communication unit 31 includes a transmission unit 31a and a reception unit 31b. The reception unit 31b receives reservation information from the reservation management server 20 and receives a request for reservation information from the meeting room terminal 90. Further, the reception unit 31b receives a check-in request from the meeting room terminal 90. Furthermore, the reception unit 31b receives, from the registration terminal 50 operated by the administrator, information indicating an association between the group of the chat system and the account. The transmission unit 31a transmits information on a reservation of a meeting room to the chat server 10 and transmits the reservation information, a reminder, or control information to the meeting room terminal 90.

The information associating unit 32 mainly performs processing relating to a preliminary registration process. Specifically, the information associating unit 32 receives a registration of a domain from the registration terminal 50 and registers the domain with a customer domain DB 495. Further, the information associating unit 32 registers the workspace and the channel of the chat system transmitted from the registration terminal 50 or the like in association with the account of the reservation management server 20 with an association information DB 491.

The reservation information acquisition unit 33 acquires the reservation information from the reservation management server 20 by designating an account of a customer who uses the facility reservation system 100. The reservation information acquisition unit 33 registers the acquired reservation information as meeting management information with a meeting management information DB 493. Alternatively, the reservation information acquisition unit 33 automatically receives reservation information when any change is made in the reservation information. Accordingly, at least a part of the reservation information stored in the reservation management server 20 is stored in the meeting management information DB 493. More specifically, the reservation information acquisition unit 33 acquires the reservation information corresponding to a predetermined period in the future from the current time among the reservation information stored in the reservation management server 20. The predetermined period is determined depending on how long a period ahead is set to future meetings for which the information on the reservation of the meeting room 6 is to be notified.

In response to the acquisition of the reservation information, the reservation information acquisition unit 33 generates an automatic cancellation task and registers the automatic cancellation task in a task queue 499. The task queue 499 is a first in first out (FIFO) queue and is executed when an execution time arrives. The automatic cancellation indicates that the facility reserved by the user is canceled without any cancellation operation input by the user. For example, if the user does not perform an operation (check-in) to start using the facility by a fixed time, the reservation is automatically canceled.

The notification determination unit 34 determines whether the meeting management information includes a reservation whose start time satisfies a condition for notification. For example, the notification determination unit 34 refers to a notification setting DB 496 to determine whether the current time matches a date and time obtained by subtracting a preset period from the start time of the reservation. When the current time matches the obtained date and time by this subtraction, the notification determination unit 34 determines that a notification is to be sent. For example, when there are plural bots according to different roles, such as a bot for sending a reminder and a bot for receiving a reservation, the notification determination unit 34 determines a suitable bot according to processing to be performed.

When the notification determination unit 34 determines that the notification is to be sent, the meeting information notification unit 37 designate information identifying the bot (e.g., a token in SLACK) and information identifying the group as the notification destination, to request the chat server 10 to transmit a notification of the information on the reservation of the meeting room 6. Note that the notification is performed several times, and the meeting identification information is included in at least one of the notifications. The meeting identification information is information for the meeting management server 30 to check whether the participant has a right to use the reserved meeting room 6 during the reserved time slot. The meeting information notification unit 37 generates the meeting identification information by the final notification at the latest. The meeting identification information is registered in a meeting identification information DB 494.

The control information generation unit 35 refers to the meeting management information DB 493 to generate control information for the electronic device 70 and registers the generated control information in a control information DB 497. For example, the control information generation unit 35 generates control information for turning on the power of the electronic device 70 several minutes before the start time of the meeting. Further, the control information generation unit 35 generates control information for turning off the power of the electronic device 70 in response to detection of the check-out. The control information is stored in the control information DB 497.

In response to receiving an inquiry from the meeting room terminal 90 located in the meeting room 6 as to whether there is control information, the control information response unit 36 refers to the control information DB 497 to transmit the control information corresponding to the meeting room 6 to the meeting room terminal 90.

The usage management unit 38 manages check-in and check-out to and from the meeting room. Further, the usage management unit 38 registers, in the meeting management information DB 493, a change in the status of meeting according to the check-in and the check-out. The check-in is allowed, for example, from 5 to 10 minutes before the start time of the meeting identified by the reservation ID. Further, the check-in is permitted when a pair of the meeting room ID and the meeting identification information transmitted from the meeting room terminal 90 is registered in the meeting identification information DB 494. When the usage management unit 38 permits check-in, the usage management unit 38 deletes the automatic cancellation task. Unless the automatic cancellation task is deleted, the task execution unit 40 cancels the reservation of the meeting room at a time, for example, 10 to 15 minutes after the start time of the meeting. In this case, the usage management unit 38 requests the reservation management server 20 to cancel the reservation. This reduces or prevents empty reservations.

The reservation information transmission unit 39 transmits the reservation information (more precisely, the meeting management information including the reservation information) stored in the meeting management information DB 493 in response to a request from the meeting room terminal 90. The reservation information transmission unit 39 transmits the reservation information in Java Script Object Notation (JSON) format, Extensible Markup Language (XML) format, or Comma-Separated Values (CVS) format, for example. Since the reservation information is repeatedly transmitted, a format having a smaller data size is preferable.

The task execution unit 40 periodically checks tasks stored in the task queue 499 and executes a particular task whose execution time has arrived. Accordingly, if the check-in request is not sent from the meeting room terminal 90 by a fixed timing based on the start time, the task execution unit 40 cancels the reservation of the meeting room (automatic cancellation) since the automatic cancellation task has not been deleted. Although in the present embodiment, the description is given of an example in which the task is the automatic cancellation task, in another example, any suitable tasks can be executed provided that the execution is triggered by a time.

When the current time reaches a certain time period (e.g., 3 to 5 minutes) before the end time of the meeting, the proposal unit 41 proposes a meeting room for which no reservation is made from meeting rooms each having an attribute that is similar to the attribute of the current conference room. Examples of the attribute include, but are not limited to, the size of a meeting room and equipment such as the type of electronic device provided in the meeting room. The proposal unit 41 proposes one or more meetings room in ascending order of a distance from the current meeting room. The proposal unit 41 transmits the meeting room(s) to be proposed to the meeting room terminal 90.

The reservation unit 42 makes a reservation for a particular meeting room selected by the user from the meeting rooms proposed by the proposal unit 41 in the reservation management server. The reservation can be made by using either an account of the meeting management server or an account of the user. The reservation unit 42 transmits information indicating a completion of the reservation to the meeting room terminal 90.

The meeting management server 30 further includes a storage unit 49. The storage unit 49 is implemented by, for example, the RAM 503 and/or the HD 504 of FIG. 3. The storage unit 49 stores the association information DB 491, a meeting room information DB 492, the meeting management information DB 493, the meeting identification information DB 494, the customer domain DB 495, the notification setting DB 496, the control information DB 497, a meeting room setting information DB 498, and the task queue 499.

TABLE 3

Association Information DB:

| Workspace | Channel | Member account 1 | Member account 2 | Member account 3 | Member account 4 |
|---|---|---|---|---|---|
| http://sample.com/1 | #marketing | a@xfood.com a@chat.com | b@xfood.com b@chat.com | c@xfood.com c@chat.com | d@xfood.com d@chat.com |
| http://sample.com/2 | #team1 | f@xfood.com f@chat.com | g@xfood.com g@chat.com | h@xfood.com h@chat.com | |
| ... | ... | ... | ... | ... | ... |

Table 3 is an example of association information stored in the association information DB 491. The association information is information associating the account of the reservation management system with the group of the chat system. The association information includes items of a workspace, a channel and member accounts 1 to n (n=4 in Table 3). The same description given above with reference to Table 2 of the workspace and the channel applies to the workspace and the channel of Table 3. In the member accounts 1 to n, the accounts of participants issued by the reservation management server 20 are registered. The accounts of the chat system can be also registered in the association information, as indicated in Table 3. To send a notification to the group, information identifying the account, issued by the reservation management server 20, of the user who has made a reservation of a meeting to the reservation management server 20 and information (in the present embodiment, the workspace and the channel name) identifying the group and channel of the notification destination will suffice. In other words, the accounts of all the members belonging to the group are not necessarily registered in the association information. However, the account information of the chat system of each individual user is required when sending a notification to the individual user. Accordingly, the account of the user of the chat system can be also registered in the association information, as indicated in Table 3.

TABLE 4

Meeting Room Information DB

| Meeting room name | Meeting room ID | Size | Equipment | Building | Floor |
|---|---|---|---|---|---|
| Meeting room A | K-001 | 15 m² | Electronic Whiteboard | A Building | 2nd floor |
| Meeting room B | K-002 | 20 m² | Projector | A Building | 2nd floor |
| Meeting room C | K-003 | 25 m² | Electronic Whiteboard; Projector | A Building | 2nd floor |

Table 4 is an example of meeting room information stored in the meeting room information DB 492. Table 4 mainly indicates attributes of meeting rooms. The meeting room information DB 492 includes items of a meeting room name, a meeting room ID, a size, equipment such as the electronic device provided in the corresponding meeting room, a building, and a floor. The proposal unit 41 proposes one or more meeting rooms by referring to the meeting room information DB 492.

Figure 9:
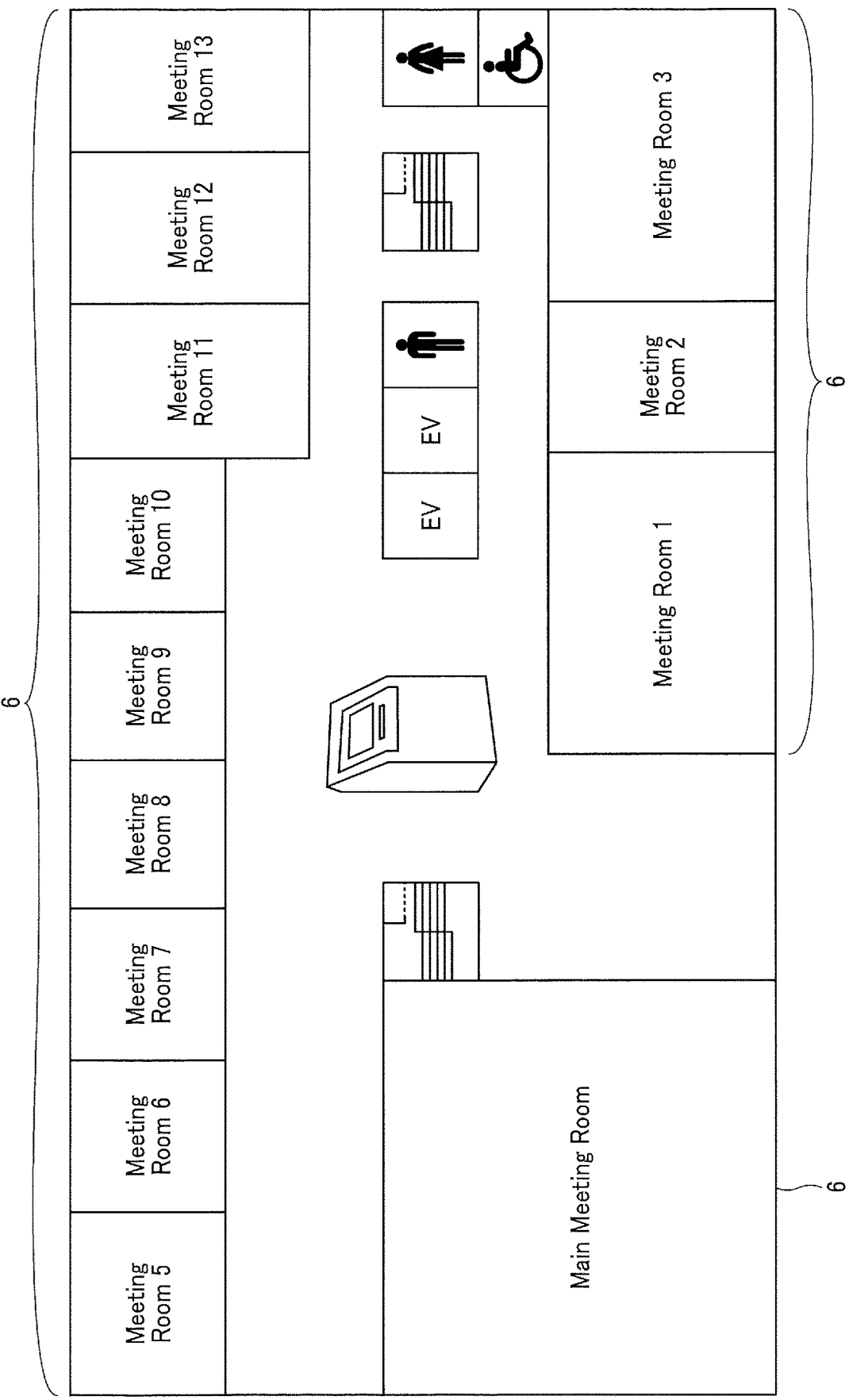
FIG. 9 is diagram illustrating an example of a meeting room layout drawing, according to an embodiment of the present disclosure.

The meeting room information DB 492 further stores a meeting room layout drawing as illustrated in FIG. 9. As illustrated in FIG. 9, each meeting room have different distances from the other meeting rooms. Accordingly, the proposal unit 41 can identify one or more particular meeting rooms close to the current meeting room.

TABLE 5

| | | | | | | | |
|---|---|---|---|---|---|---|---|
| Meeting Management Information DB ||||||||
| Reservation ID | Account of reservation-making user | Meeting name | Meeting room ID | Start time | End time | Account of expected participant | Status |
| 001 | a@xfood.com | Product Z development Meeting | K-001 | Jul. 7, 2017 10:00 | Jul. 7, 2017 12:00 | b@xfood.com c@xfood.com d@xfood.com | Checked in |
| 002 | e@xfood.com | Product Y development meeting | K-001 | Jul. 7, 2017 13:00 | Jul. 7, 2017 14:00 | f@xfood.com g@xfood.com | Reservation information Notified |
| ... | ... | ... | ... | ... | ... | ... | ... |

Table 5 is an example of the meeting management information stored in the meeting management information DB 493 of the meeting management server 30. Since the reservation information is included in the management information stored in the meeting management information DB 493, in the following description of Table 5, differences from the reservation information DB 291 of Table 1 are described. The meeting management information in Table 5 includes "status" as an item. The status indicates the status of a reservation. For example, the status registered in the meeting management information of Table 5 indicates whether a notification of the information on the reservation of the meeting room 6 has been sent, whether the use of the meeting room has been confirmed, whether the check-in operation is being waited, whether the check-out operation has been performed, whether the check-in operation has been performed, or whether the reservation has been cancelled.

TABLE 6

| | | |
|---|---|---|
| Meeting Identification Information DB |||
| Reservation ID | Meeting room ID | Meeting identification information |
| 001 | K-001 | 1234 |
| 002 | K-002 | 5678 |
| ... | ... | ... |

Table 6 is an example of meeting identification information management information stored in the meeting identification information DB 494. The meeting identification information management information is information for managing the meeting identification information for each reservation of the meeting room 6. The meeting identification information management information includes items of the reservation ID, the meeting room ID, and the meeting identification information. The reservation ID, the meeting room ID, and the meeting identification information of the meeting identification information management information in Table 6 are the same or substantially the same as those of the reservation information (the reservation information acquired from the reservation management server 20), which further includes the status. Accordingly, the redundant descriptions thereof are omitted. Note that the reservation ID is registered in order to identify the reservation of the same meeting room 6. The status indicates the status of a reservation. For example, the status indicates whether a notification of the information on the reservation of the meeting room has been sent, whether the use of the meeting room has been confirmed, whether the check-in operation has been performed, whether the check-out operation has been performed, or whether the reservation has been cancelled.

TABLE 7

| | |
|---|---|
| Customer Domain DB ||
| Customer's domain name | Customer's administrator account |
| xfood.com | a@xfood.com |
| ycar.com | f@ycar.com |
| ... | ... |

Table 7 is an example of customer domain information stored in the customer domain DB 495. The customer domain information is information for managing a customer's domain name and an account of an administrator of the customer. The customer domain information stores the domain name of the customer in association with the administrator's account. The domain name of the customer in Table 7 is the domain name of the account (email address) issued by the reservation management server 20. The administrator's account is the account of the administrator (representative) of the customer. The reservation management server 20 issues the accounts in Table 7.

TABLE 8

| | |
|---|---|
| Notification Setting DB ||
| Customer's domain name | Notification Setting |
| xfood.com | 1 day before |
| ycar.com | 12 hours before |
| ... | ... |

Table 8 is an example of notification setting information stored in the notification setting DB 496. The notification setting information includes, for each of the customers, settings relating to a notification. The notification setting information stores the domain name of the customer in association with notification settings. The notification setting indicates a time at which the information on the reservation of the meeting room 6 is to be notified. In this example, the timing defines how long ahead the start time of the meeting the notification of the information on the reservation of the meeting room is to be sent. In another example, a fixed date and time can be set in the notification settings. Further, the number of the timings set in the notification settings is not necessarily one. A plurality of notification settings can be registered in association with one customer.

TABLE 9

| Control Information DB | |
| --- | --- |
| Meeting Room ID | Control Content |
| K-001 | Turn on |
| K-002 | Turn off |
| ... | ... |

Table 9 is an example of control information stored in the control information DB 497. The control information is information for controlling the electronic device 70 provided in the meeting room 6. The control information includes items of the meeting room ID and a control content. The control content indicates a specific control operation of the electronic device 70. The meeting management server 30 sets details as a control setting for each electronic device 70. The control information does not include information indicating a time at which the electronic device 70 is to be controlled. This is because it is difficult for the meeting management server 30 to access the meeting room terminal 90, since the meeting management server 30 resides on the external network N2. Accordingly, the meeting management server 30 transmits the control content when the control information has already been generated and when being accessed from the meeting room terminal 90.

TABLE 10

| Meeting Room Setting Information DB | | | | | |
| --- | --- | --- | --- | --- | --- |
| Meeting room name | Meeting room ID | State of meeting room terminal | Authentication key | Management start flag | Access time |
| Meeting room A | K-001 | Connected | ***** | True | Oct. 15, 20XX 12:34 |
| Meeting room B | K-002 | Connected | ***** | False | Oct. 15, 20XX 12:48 |
| Meeting room C | K-003 | Disconnected | ***** | True | Oct. 15, 20XX 12:50 |

Table 10 is an example of meeting room setting information stored in the meeting room setting information DB 498. The meeting room setting information indicates settings for each meeting room. The meeting room setting information includes items of a meeting room name, the meeting room ID, a state of the meeting room terminal, an authentication key, a management start flag, and an access time. The meeting room name is a general-purpose name of a meeting room recognized by participants attending in the meeting. Examples of the meeting room name include a name that is presented at the entrance of the meeting room. The meeting room ID is identification information for uniquely identifying a meeting room, as described above. In one example, the meeting room ID is common to the meeting room setting information and the reservation management server 20, to simplify the configuration and operation. In another example, a conversion table is provided that allows the administrator to set the different meeting room ID from that stored in the reservation management server 20. The state of the meeting room terminal indicates whether the configuration of initial settings of the meeting room terminal 90 has been completed, whether communication is possible, and the like. "Connected" in the state of the meeting room indicates a state in which communication is confirmed by polling, for example. "Before setup" in the state of the meeting room terminal indicates a state in which the initial settings have not been configured yet. "Disconnected" in the state of the meeting room terminal indicates a state in which no communication has been performed for equal to or longer than a certain time period (M minutes in the present embodiment). The authentication key is authentication information used by the meeting management server 30 to authenticate the meeting room terminal 90. The authentication key is transmitted to the meeting room terminal 90 by the initial settings. The authentication key is a combination of numbers, alphabets, symbols, and the like that are too long to be identified by brute force attack. In one example, the meeting management server 30 determines the authentication key. In another example, the administrator determines the authentication key. The management start flag is a flag indicating whether the meeting management server 30 starts managing the meeting room after the initial settings of the meeting room terminal 90 has been configured. The value "true" set in the management start flag indicates that the meeting management server 30 starts managing the meeting room. The value "false" set in the management start flag indicates that the meeting management server 30 does not start managing the meeting room. The management start flag substantially eliminates inconveniences caused by a time lag between the time when the configuration of the initial settings is completed and the time when the meeting room terminal 90 is arranged in the meeting room. The access time is a time when the reservation information periodically requested by the meeting room terminal 90 is recorded every N minutes. The recording of access time is not limited to in response to the request for reservation information, and the time of communication with the meeting room terminal 90 may be recorded.

TABLE 11

| Task Queue | | | |
| --- | --- | --- | --- |
| Task ID | Execution time | Task content | Reservation ID |
| T-001 | Oct. 17, 20XX 10:10 | Automatic cancellation | 002 |
| T-002 | Oct. 17, 20XX 13:10 | Automatic cancellation | 003 |

Table 11 is an example of tasks stored in the task queue 499. The tasks to be executed by the meeting management server 30 are registered in the task queue 499 in a chronological order. The task queue 499 includes items of a task ID, an execution time, a task content, and the reservation ID. The task ID is identification information for identifying a task. The execution time is time when the task is to be executed. The task content indicates a specific content of the task. The reservation ID is set to identify the reservation information in the meeting management information DB 493. For example, when a reservation of the meeting room is canceled, the task execution unit 40 identifies the reservation information in the meeting management information DB 493 and changes the status to "cancelled".

Figure 7B:
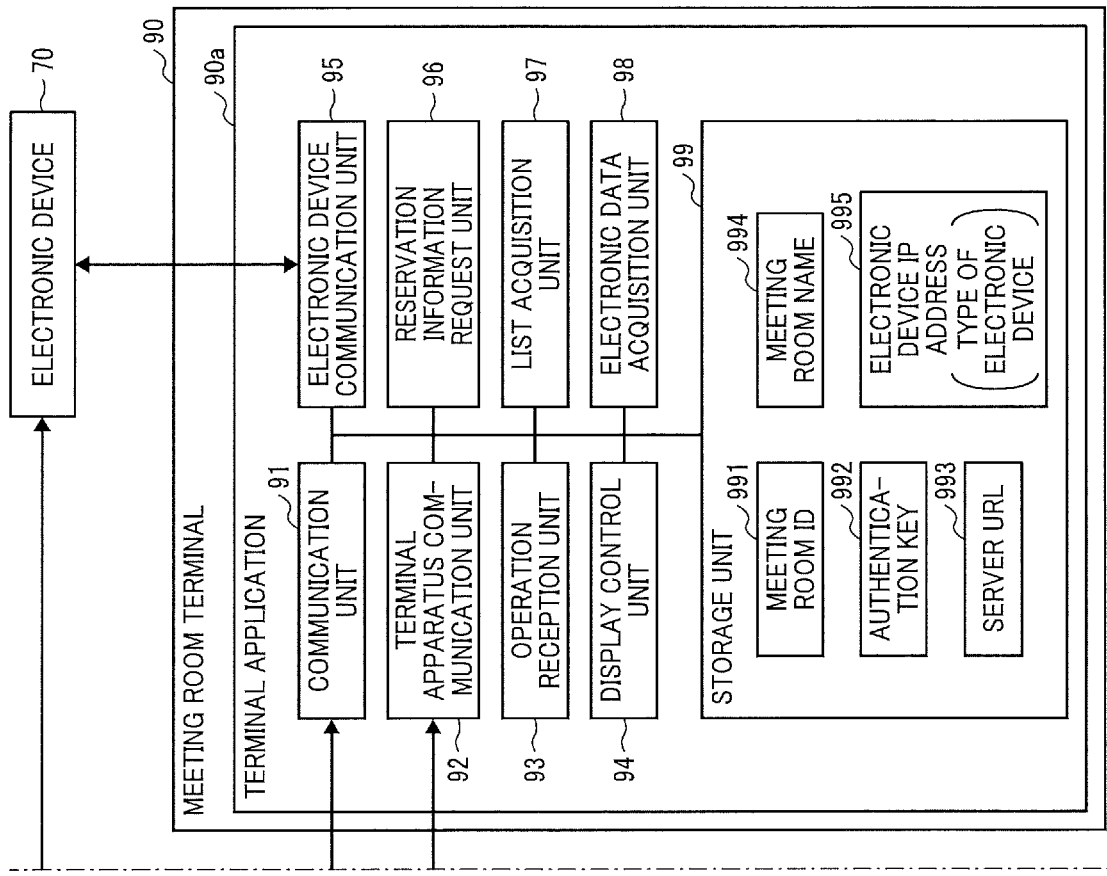

Terminal Apparatus:

FIGS. 7A and 7B (FIG. 7) are block diagrams illustrating an example of functional configurations of the terminal apparatus 60 and the meeting room terminal 90. The functions of the registration terminal 50 are described as needed.

The terminal apparatus 60 includes a communication unit 61a, an operation reception unit 61b, a display control unit 61c, a chat communication unit 62, a text display unit 63, an application communication unit 64, a server communication unit 65, a display control unit 66, an application communication unit 67, a communication unit 68, a terminal communication unit 69, an operation reception unit 81, a resource information acquisition unit 82, an electronic data collection unit 83, an imaging unit 84, and an electronic data management unit 85. These functional units of the terminal apparatus 60 are functions or means that are implemented by operating one or more hardware elements illustrated in FIG. 4 in cooperation with instructions of the CPU 701 according to the program loaded from the EEPROM 704 to the RAM 703. The program is distributed from a server for program distribution or distributed as stored in a storage medium. Since the chat application 60a and the meeting application 60b operate on the terminal apparatus 60, the program includes the chat application 60a and the meeting application 60b (an example of a program in the claims).

The communication unit 61a transmits and receives various types of information to and from the meeting management server 30 and the reservation management server 20. The operation reception unit 61b receives various operations that are input by the participant to the terminal apparatus 60.

The display control unit 61c interprets screen information of various screens to display screens on the display 506. The operation reception unit 61b and the display control unit 61c includes, for example, a browser function and executes a web application. For example, the display control unit 61c displays a reservation setting screen received from the reservation management server 20, and the operation reception unit 61b receives reservation information set by a reservation-making user.

The chat communication unit 62 of the chat application 60a transmits and receives various types of information to and from the chat server 10. In the present embodiment, the chat communication unit 62 receives information on the reservation of the meeting room 6 from the chat server 10. Further, the chat communication unit 62 sends, to the chat server 10, a notification indicating that a message of the information on the reservation of the meeting room 6 has been read and a notification indicating whether the meeting room 6 is to be used or canceled.

The text display unit 63 of the chat application 60a displays text (the information related to the reservation of the meeting room 6) transmitted from the chat server 10. For example, the text display unit 63 displays the text as if the source of the message were the bot and as if the bot inputted the text.

The application communication unit 64 of the chat application 60a invokes the meeting application 60b and transmits the meeting identification information to the meeting application 60b. The chat server 10 transmits information identifying the meeting application 60b to the terminal apparatus 60, when notifying the terminal apparatus 60 of the information on the reservation of the meeting room 6. Accordingly, the chat application 60a designates the meeting application 60b to the OS and requests notification of the meeting identification information. The OS activates the meeting application 60b.

The server communication unit 65 of the meeting application 60b communicates with the meeting management server 30 or the reservation management server 20. For example, the server communication unit 65 obtains a two-dimensional code including the meeting identification information from the meeting management server 30. The two-dimensional code is used for authentication at check-in. Instead of or in addition to the two-dimensional code, numbers of a several digits can be used for authentication. Further, the server communication unit 65 receives reservation information of a meeting in which the user participates from the reservation management server 20.

The display control unit 66 of the meeting application 60b displays the two-dimensional code or the like including meeting identification information on the display 718.

The application communication unit 67 of the meeting application 60b obtains various kinds of information from the chat application 60a through the OS. Examples of the various kinds of information obtained from the chat application 60a include the meeting identification information included in the information on the reservation of the meeting room 6.

The communication unit 68 of the meeting application 60b communicates with the electronic device 70 to exchange electronic data. The communication unit 68 communicates with the electronic device 70 by Bluetooth (registered trademark) or Wi-Fi, for example.

The terminal communication unit 69 of the meeting application 60b communicates with the meeting room terminal 90 to transmit the meeting identification information, etc. The terminal communication unit 69 detects the meeting room terminal 90 using a short-range wireless communication network such as Bluetooth (registered trademark). In response to detecting the meeting room terminal 90, the terminal communication unit 69 transmits the meeting identification information to the detected meeting room terminal 90. Alternatively, the terminal communication unit 69 can communicate with the meeting room terminal 90 by Wi-Fi. Further, the terminal communication unit 69 provides a function of displaying the two-dimensional code for a check-in (when checking in with the two-dimensional code) to the meeting room terminal 90.

The resource information acquisition unit 82 acquires, from the reservation management server 20 via the server communication unit 65, reservation information (in which the user participates) of the current time included in schedule information of the user using the terminal apparatus 60. The acquired reservation information includes, for example, a date and time of the meeting, a meeting name, a participant(s), and a document.

The electronic data collection unit 83 collects electronic data used during the meeting from the electronic device 70 via the communication unit 68. The imaging unit 84 generates image data of a subject in response to a user operation. In the present embodiment, the imaging unit 84 captures, for example, electronic data such as handwritten data displayed by the electronic device 70.

The electronic data management unit 85 stores, in the electronic data DB 89, the electronic data collected by the electronic data collection unit 83, the electronic data obtained by capturing by the imaging unit 84, and the electronic data of a document associated with the reservation information. The electronic data is stored in association with, for example, the meeting name of the reservation information of the meeting in which the user participates, the reservation information being acquired by the resource information acquisition unit 82. Thus, the meeting name is associated with the electronic data.

TABLE 12

Electronic Data DB

| Meeting Date and time | Meeting name | Name of Document 1 | URL of Document 1 | ... ... | Name of Document 4 | URL of Document 4 | Output Electronic Device |
|---|---|---|---|---|---|---|---|
| 2019 Aug. 30 11:00-12:00 | ZZ Regular Meeting | Electronic whiteboard captured image 1 | http://192.168.1.5/Doc/20190830/ZZmtg/wb1.jpeg | ... ... | About competitive information | http://192.168.1.5/Doc/20190830/ZZmtg/document.pdf | Electronic whiteboard |
| 2019 Sep. 15 13:00-14:00 | YY Discussion | Electronic whiteboard captured image 1 | http://192.168.1.5/Doc/20190915/YYmtg/wb1.jpeg | ... ... | Design data | http://192.168.1.5/Doc/20190915/YYmtg/document.pdf | Electronic whiteboard |
| . | . | . | . | . . | . | . | . |
| . | . | . | . | . . | . | . | . |
| . | . | . | . | . . | . | . | . |

Table 12 is an example of an electronic data table stored in the electronic data DB 89 by the meeting application 60b. The electronic data DB 89 includes items of a meeting date and time, a meeting name, a name of Document 1, a uniform resource locator (URL) of Document 1, . . . a name of Document n, a URL of Document n (n is a natural number), and an output electronic device. The meeting date and time and the meeting name are acquired from the user schedule DB 292. The name of Document 1 and the URL of Document 1 to the name of Document n and the URL of Document n indicates electronic data used in the meeting. The electronic data is classified into data generated by the electronic device 70, data obtained by photographing by the user, and data of a document registered in the reservation management server 20. In one example, such classification is indicated by the file name. In another example, such classification is indicated by a flag.

The URL of each document indicates a URL of a folder in the terminal apparatus 60 or a URL of a folder on the Internet or on-premise environment as a storage location of the electronic data. The output electronic device as the item indicates a type of the electronic device 70 from which the electronic data is output. Examples of the output electronic device include, but are not limited to, an electronic whiteboard, a projector, and a multifunction peripheral. The electronic device 70 that outputs the electronic data may be recorded for each electronic data.

In a case in which the terminal apparatus 60 stores the electronic data in a cloud storage (which may be on-premise or on the Internet) instead of in the terminal apparatus itself, a storage area of the terminal apparatus 60 is less likely to used up.

Meeting Room Terminal:

The meeting room terminal 90 includes a communication unit 91, a terminal apparatus communication unit 92, an operation reception unit 93, a display control unit 94, an electronic device communication unit 95, a reservation information request unit 96, a list acquisition unit 97, and an electronic data acquisition unit 98. These functional units of the meeting room terminal 90 are functions or means that are implemented by operating one or more hardware elements illustrated in FIG. 4 in cooperation with instructions of the CPU 701 according to the program loaded from the EEPROM 704 to the RAM 703. The program is distributed from a server for program distribution or distributed as stored in a storage medium.

The communication unit 91 communicates with the meeting management server 30 with a server URL 993 as a destination. Since the meeting room terminal 90 resides on the intra-company network N1, accessing from the meeting management server 30 to the meeting room terminal 90 is difficult. For this reason, the communication unit 91 polls the meeting management server 30 to periodically communicate with the meeting management server 30. In addition to or in alternative to the polling, the communication unit 91 communicates with the meeting management server 30 using a communication technology such as Web Socket. When there is no communication from the communication unit 91, "disconnected" is registered in the meeting room setting information DB 498. The communication unit 91 performs communication using a communication protocol such as Hypertext Transfer Protocol (HTTP). Any other suitable communication protocol other than HTTP can be used.

The communication unit 91 according to the present embodiment transmits, to the meeting management server 30, the meeting identification information, which is received by the terminal apparatus communication unit 92 from the terminal apparatus 60 or is manually input at the time of check-in. When the use of the meeting room is permitted, the communication unit 91 receives information for displaying the electronic data from the meeting management server 30. Further, the communication unit 91 transmits information for displaying the electronic data to the meeting management server 30 in response to the check-out of the meeting room (operation to end the use). Furthermore, the communication unit 91 receives the control information from the meeting management server 30.

The terminal apparatus communication unit 92 communicates with the terminal apparatus 60 by the short-range wireless communication network such as Bluetooth (registered trademark), Wi-Fi, and the NFC. In the present embodiment, the terminal apparatus communication unit 92 receives the meeting identification information, etc.

The list acquisition unit 97 acquires a list of meetings in which a user participated in the past from the terminal apparatus via the terminal apparatus communication unit 92. The electronic data acquisition unit 98 acquires electronic data used in one or more particular meetings selected by the user from the list.

The electronic device communication unit 95 communicates with the electronic device 70. In the present embodiment, the electronic device communication unit 95 transmits, to the electronic device 70, the control information received by the communication unit 91. Further, at the time of check-in, the electronic device communication unit 95 transmits electronic data transmitted from the terminal apparatus 60 to the electronic device 70. In another example, the electronic device communication unit 95 transmits information for displaying electronic data, instead of transmitting and receiving the electronic data itself. For example, Wi-Fi is used for communication. In another example, Bluetooth (registered trademark), which consumes less power, is used. In this case, a short-range wireless communication network such as Bluetooth (registered trademark) is used for the electronic device 70 to accept the power on, and Wi-Fi (access point) becomes effective after activation, so the electronic data can be transmitted and received using Wi-Fi. In one example, Bluetooth (registered trademark) is paired in advance. In another example, when pairing is not required, the electronic device communication unit 95 searches for a device in a short distance at the time of execution.

The display control unit 94 displays a screen generated by the terminal application 90a on the display 718. The screen displayed by the display control unit 94 is the reservation status screen 300 that receives a check-in and a check-out. Further, the display control unit 94 controls the display 718 to displays the list of meetings acquired by the list acquisition unit 97. The operation reception unit 93 receives various operations input to the meeting room terminal 90, the various operations including the selection from the list.

The reservation information request unit 96 repeatedly transmits the meeting room ID and the authentication key to the meeting management server 30 via the communication unit 91 at a periodic time interval for acquiring the reservation information. As a response to the transmission of the meeting room ID and the authentication key, the reservation information request unit 96 acquires the reservation information via the communication unit 91. It is sufficient that the reservation information be acquired when any change is made in the reservation information. Examples of the periodical timings when the reservation information request unit 96 acquires the reservation information include from every several seconds to every several minutes. The shorter the periodical timings, the sooner the reservation information updated. However, The shorter the periodical timings, the greater the communication load. Accordingly, the periodical timings are determined in view of both the update frequency of the reservation information and the communication load. In the present embodiment, the reservation information request unit 96 acquires the reservation information every thirty seconds, for example. Further, the reservation information request unit 96 receives at least the meeting management information (reservation information) of the meeting room 6 of the current day via the communication unit 91.

The meeting room terminal 90 further includes the storage unit 99. The storage unit 99 is implemented by, for example, the ROM 702 and/or the EEPROM 704 illustrated in FIG. 4. The storage unit 99 stores a meeting room ID 991, an authentication key 992, the server URL 993, a meeting room name 994, and an IP address 995 of the electronic device 70. The meeting room ID 991, the authentication key 992, the server URL 993, and the meeting room name 994 are stored by the initial settings of the meeting room terminal 90. The meeting room terminal 90 communicates with the meeting management server 30 to acquire reservation information by using the meeting room ID 991, the authentication key 992, and the server URL 993. The IP address 995 of the electronic device 70 is set by the administrator, for example. Further, a type of the electronic device 70 is associated with the IP address 995 of the electronic device 70.

Figure 10:
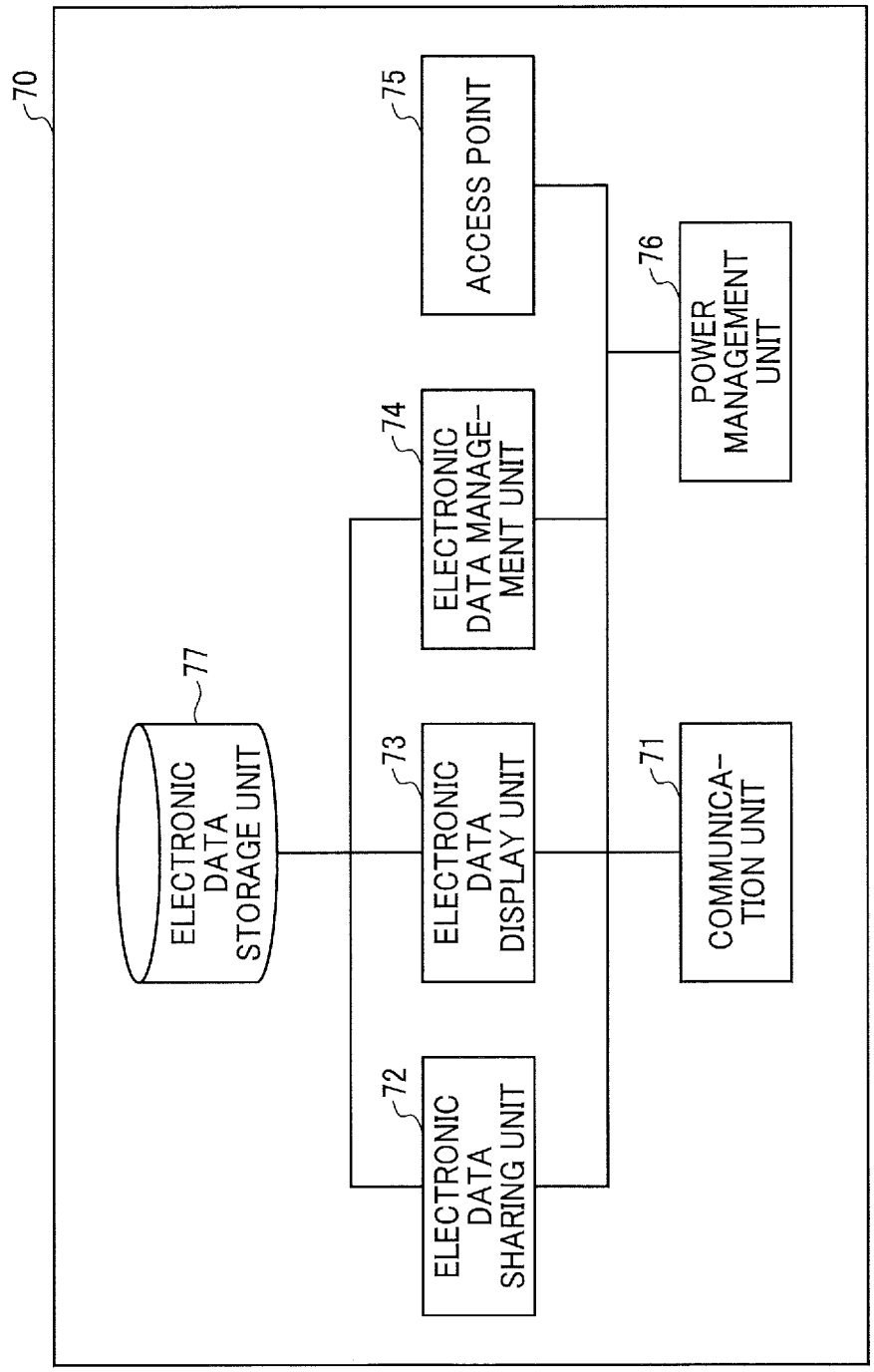
FIG. 10 is a block diagram illustrating an example of a functional configuration of the electronic device, according to an embodiment of the present disclosure.

Electronic Device:

FIG. 10 is a block diagram illustrating an example of a functional configuration of the electronic device 70. The electronic device 70 includes a communication unit 71, an electronic data sharing unit 72, an electronic data display unit 73, an electronic data management unit 74, an access point 75, and a power management unit 76. These functional units of the electronic device 70 are functions or means that are implemented by operating one or more hardware elements illustrated in FIG. 5 in cooperation with instructions of the CPU 201 according to the program loaded from the SSD 204 to the RAM 203.

The communication unit 71 communicates with the meeting room terminal 90 wirelessly or by wire. Even if the power of the electronic device 70 is turned off before the check-in, the communication unit 71 is in a sleep state. Accordingly, even in such state, the communication unit 71 receives check-in notifications and control information from the meeting room terminal 90. In response to receiving the check-in notification by the communication unit 71 from the meeting room terminal 90, the power management unit 76 activates the electronic device 70.

In response to the activation of the electronic device 70, the access point 75 starts up, thereby randomly generates a service set identifier (SSID) and an encryption key and constructs a local wireless network. This enables the terminal apparatus 60 or the meeting room terminal 90 to connect to the access point 75. The access point 75 displays connection information (SSID and encryption key) to connect to the network on the display 280. This information may be transmitted to the meeting room terminal 90 for display.

The electronic data sharing unit 72 includes a file sharing function such as the File Transfer Protocol (FTP) server and starts sharing electronic data. For example, the electronic data sharing unit 72 stores electronic data received by the communication unit 71 from the meeting room terminal 90 in an electronic data storage unit 77. When the communication unit 71 receives information for receiving the electronic data, the electronic data sharing unit 72 acquires the electronic data with the information for displaying the electronic data and stores the electronic data in the electronic data storage unit 77. Further, the electronic data sharing unit 72 stores the electronic data received from the terminal apparatus 60 of the participant via the access point 75 during a meeting in the electronic data storage unit 77.

The electronic data management unit 74 manages the electronic data stored in the electronic data storage unit 77. For example, the electronic data management unit 74 acquires (reads) electronic data received from the terminal apparatus 60 at the time of check-in and controls the electronic data display unit 73 to display the acquired (read) electronic data. When plural pieces of electronic data are received from the terminal apparatus 60 at the time of check-in, the electronic data management unit 74 acquires (reads) predetermined electronic data (e.g., a page whose creation time is oldest, a first page, a last page) and controls the electronic data display unit 73 to display the acquired (read) predetermined electronic data.

The electronic data display unit 73 controls the display to perform display processing based on the electronic data stored in the electronic data storage unit 77. Further, the electronic data display unit 73 controls the display to display a URL for a guest terminal (terminal apparatus 60) to access the electronic data. This information may also be transmitted to the meeting room terminal 90 for display. The terminal apparatus 60 can connect to the access point 75 to transmit electronic data to the electronic device 70.

During the meeting, the electronic data management unit 74 stores the electronic data transmitted from the terminal apparatus 60 in the electronic data storage unit 77 in association with the reservation ID. This reservation ID is for the reservation information of the meeting room checked in by the user. When electronic data transmitted from the meeting room terminal 90 is already stored in the electronic data storage unit 77 at the time of check-in, the electronic data transmitted from the terminal apparatus 60 is added to the already-stored electronic data or is stored separately from the already-stored electronic data. When the electronic data transmitted from the terminal apparatus 60 is stored separately, the electronic data is distinguished by the reservation ID.

When the communication unit 71 receives, from the terminal apparatus 60, a request for acquiring electronic data, the electronic data management unit 74 transmits all the electronic data including the electronic data of the current day or the electronic data of the past meeting(s) from the electronic data storage unit 77 to the communication unit 71. The communication unit 71 transmits the electronic data to the terminal apparatus 60. The electronic data management unit 74 deletes the electronic data stored in the electronic data storage unit 77. Then, the power management unit 76 controls the electronic device 70 to transition to a sleep state.

Figure 11:
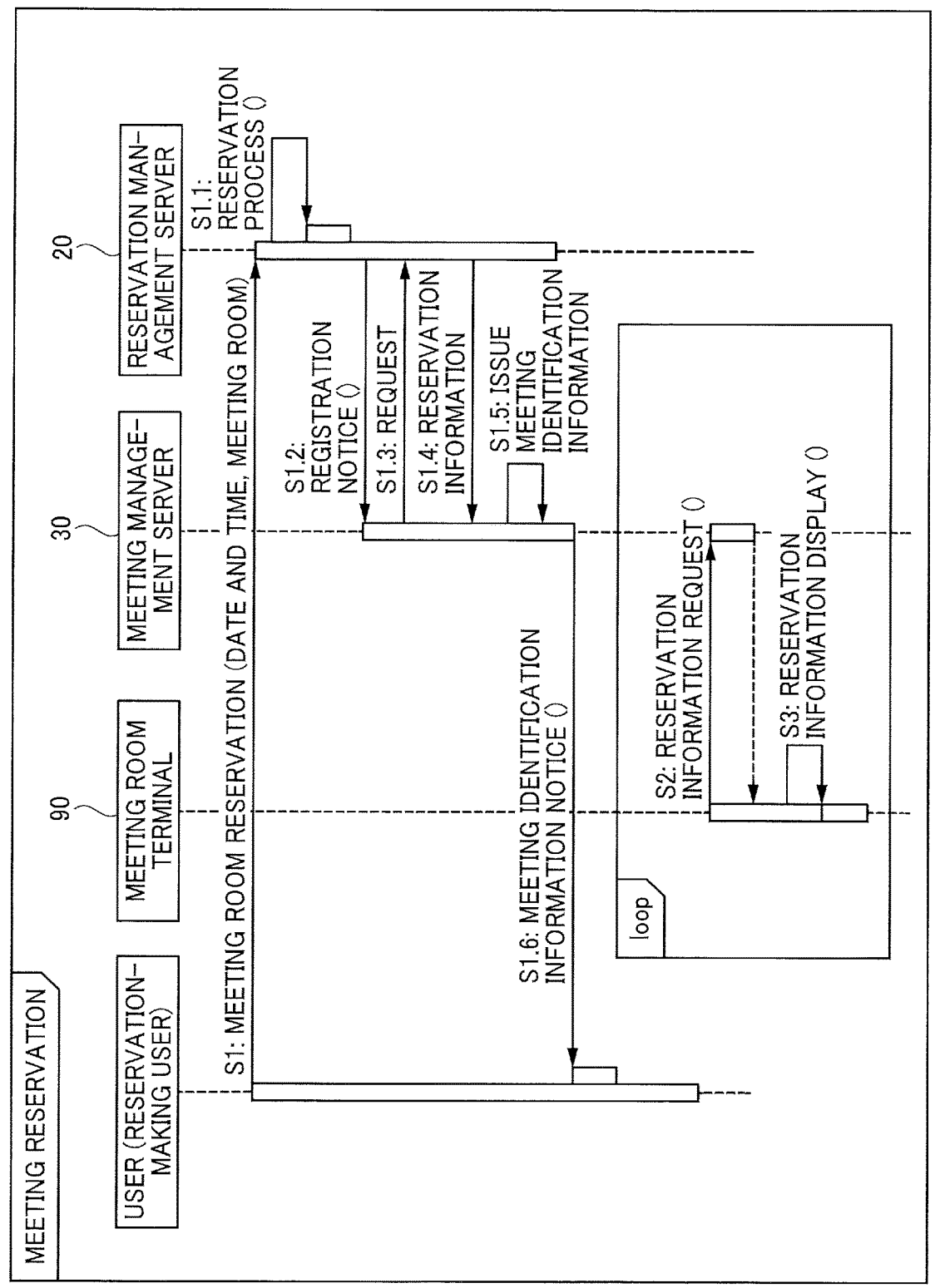
FIG. 11 is a sequence diagram illustrating an example of an operation from reservation of a meeting room to display of a reservation status screen, according to an embodiment of the present disclosure.

Reservation Status Screen Displayed by Meeting Room Terminal:

A description is now given on an operation of displaying the reservation status screen 300 displayed by the meeting room terminal 90 with reference to FIG. 11. FIG. 11 is a sequence diagram illustrating an example of an operation from reservation of a meeting room to display of the reservation status screen 300.

In step S1, a reservation-making user operates the terminal apparatus 60 to connect to the reservation management server 20 and receives authentication from the reservation management server 20. When the authentication is successful, the reservation-making user makes a reservation for a meeting room with settings of a meeting start time and end time, the meeting room, a meeting name, a document to be used in the meeting, etc. by using a particular web page or a dedicated application. The communication unit 61a of the terminal apparatus 60 transmits these reservation information to the reservation management server 20.

In step S1.1, the communication unit 21 of the reservation management server 20 receives the reservation information, and the reservation information management unit 22 registers the reservation information in the reservation information DB 291. The reservation information is a part of the schedule for each meeting room. Further, since the reservation-making user is identified based on the account of the reservation-making user, the reservation information management unit 22 registers a schedule of the reservation-making user himself or herself in the user schedule DB 292.

In step S1.2, when any change is made in the reservation information, the communication unit 21 of the reservation management server 20 notifies the meeting management server 30 of the change in the reservation information together with the domain of the reservation-making user.

In step S1.3, the reservation information acquisition unit 33 of the meeting management server 30 requests the reservation information by designating the domain that identifies the customer from the reservation management server 20 periodically or in response to the notification from the reservation management server 20. License information of the meeting management server 30 is also included for authentication.

In step S1.4, the communication unit 21 of the reservation management server 20 receives the request and transmits the reservation information of the reservation-making user having the designated domain acquired from the reservation information DB 291 by the reservation information management unit 22 to the meeting management server 30.

In step S1.5, the reservation information acquisition unit 33 of the meeting management server 30 acquires the reservation information and stores the reservation information in the meeting management information DB 493. The reservation information acquisition unit 33 issues meeting identification information for each acquired reservation information and stores the meeting identification information in the meeting identification information DB 494.

In step S1.6, the meeting information notification unit 37 of the meeting management server 30 detects the reservation-making user or the participant from the association information DB 491, identifies information that identifies the group on the chat server 10, and notifies the chat server 10 of the completion of the reservation (including the meeting identification information). Thus, the text processing unit 12 of the chat server 10 broadcasts the reservation information such as the meeting identification information to the group (workspace channel) identified by the information that identifies the group. In another example, the notification is sent by email. The reservation-making user or the participant inputs the meeting identification information as needed to the meeting room terminal 90 at the time of check-in.

In step S2, the reservation information request unit 96 of the meeting room terminal 90 requests the meeting management server 30 for the reservation information periodically or in response to an operation by the participant by designating the authentication key 992 and the meeting room ID 991 with the server URL 993 as a destination. When one meeting room terminal 90 is provided for plural meeting rooms, plural authentication keys 992 and plural meeting room Ids 991 are transmitted. The reception unit 31b of the meeting management server 30 receives the request. When the pair of the authentication key and the meeting room ID is stored in the meeting room setting information DB 498, the transmission unit 31a acquires reservation information (information in the meeting management information DB) identified by the meeting room ID from the meeting management information DB 493 and transmitted the acquired the reservation information to the meeting room terminal 90.

In step S3, the communication unit 91 of the meeting room terminal 90 receives the reservation information, and the display control unit 94 displays the reservation information on the reservation status screen 300. An example of the reservation status screen 300 is illustrated in FIG. 12.

Reservation Status Screen:

An example of a screen operated by the user at the time of check-in or check-out is described with reference to FIG. 12. FIG. 12 is a diagram illustrating an example of the reservation status screen 300 displayed by the meeting room terminal 90. The reservation status screen of FIG. 12 is a reservation status screen displayed by the meeting room terminal 90 provided for plural meeting rooms.

Figure 12:
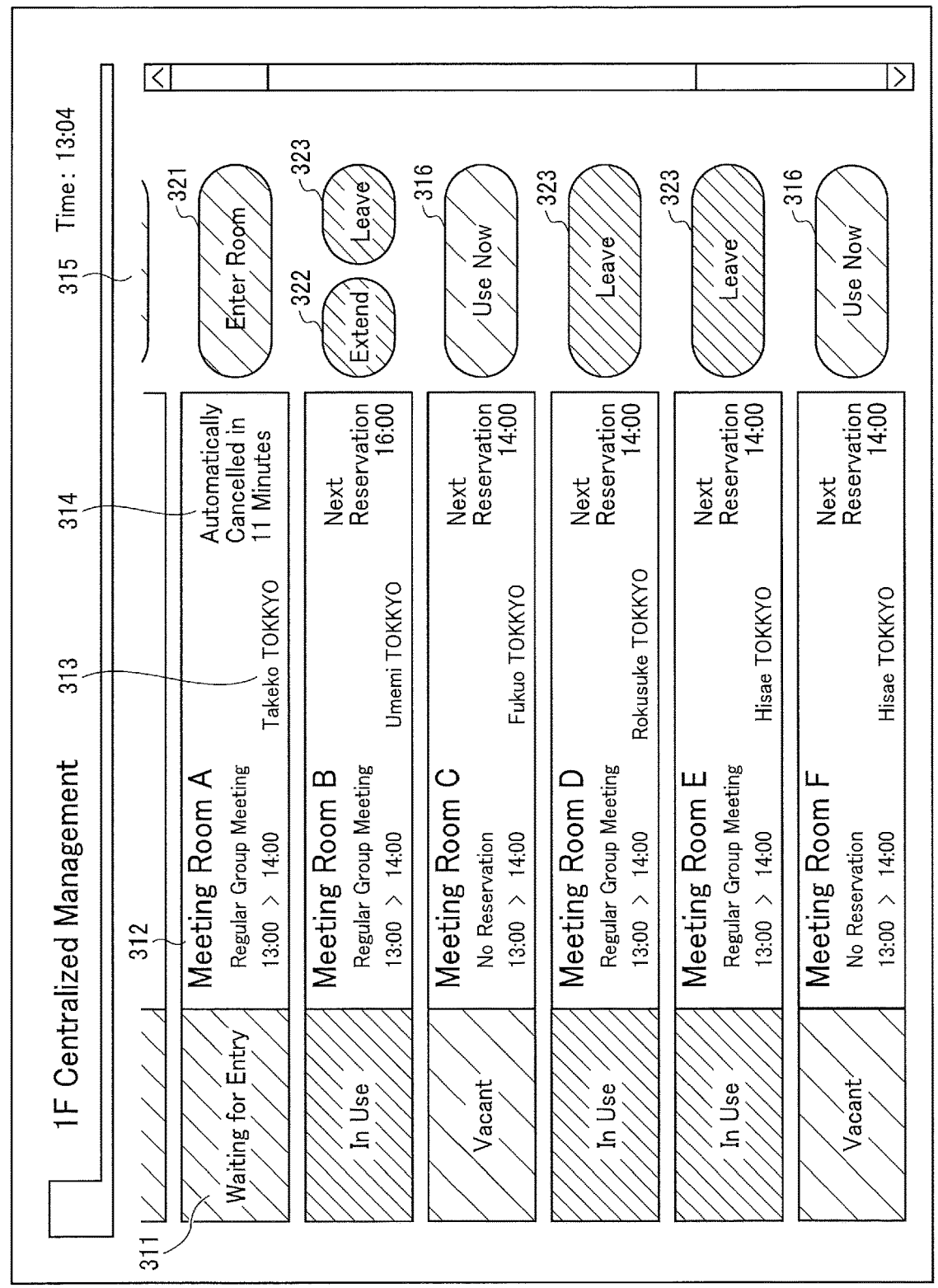
FIG. 12 is a diagram illustrating an example of a reservation status screen displayed by the meeting room terminal, according to an embodiment of the present disclosure.

The reservation status screen 300 of FIG. 12 includes items of a usage status 311, detailed information 312, a reservation-making user name 313, a message 314, and button field 315. The usage status 311 indicates the current usage status of the meeting room based on the status of the reservation information. Examples of the displayed current usage status include, but are not limited, waiting for entry (waiting for check-in), in use (checked-in), and vacant. The detailed information 312 indicates the meeting room name, meeting name, start time and end time. The information displayed as the detailed information 312 is included in the reservation information managed by the meeting management server 30. The reservation-making user name 313 indicates the name of the reservation-making user. The reservation-making user name is included in the reservation information managed by the meeting management server 30. The message 314 indicates the remaining time until an automatic cancellation and the start time of the next reservation. These information are transmitted from the meeting management server 30. The button field 315 includes a "use now" button 316, an "enter room" button 321, an "extend" button 322, and a "leave" button 323. The buttons are displayed depending on situations. The "use now" button 316 is a button for the user to reserve the meeting room immediately (the meeting management server reserves the meeting room in the reservation management server 20 with the license of the meeting management server 30, thereby allowing the user to check in to the meeting room by using the meeting room terminal 90. The "use now" button 316 is displayed when the meeting room is vacant. The "enter room" button 321 is displayed when the usage status is the waiting for check-in. The "enter room" button 321 is an example of a display component that accepts the start of use. This room entry corresponds to the check-in. The "extend" button 322 and the "leave" button 323 are displayed when the usage status is the "in use". The "extend" button 322 and the "leave" button 323 allows the reservation-making user who has already checked in to extend the meeting or to check out. However, when the extension is not available (e.g., when the next meeting is reserved), the "extend" button 322 is not displayed. This leaving the room corresponds to the check-out.

Although in the description given above with reference to FIG. 12 is of an example in which the reservation status screen 300 indicates the statuses of plural meeting rooms so that all the buttons are illustrated in one diagram. However, when the meeting room terminal 90 is dedicated to one meeting room, only the reservation status of the one meeting room is displayed.

The reservation status screen 300 is displayed using the reservation information received from the meeting management server 30 by the terminal application 90a of the meeting room terminal 90. In another example, the reservation status screen 300 is displayed by operating the web browser on the meeting room terminal 90 and displaying the web page transmitted from the meeting management server 30 by the web browser.

Figure 13A:
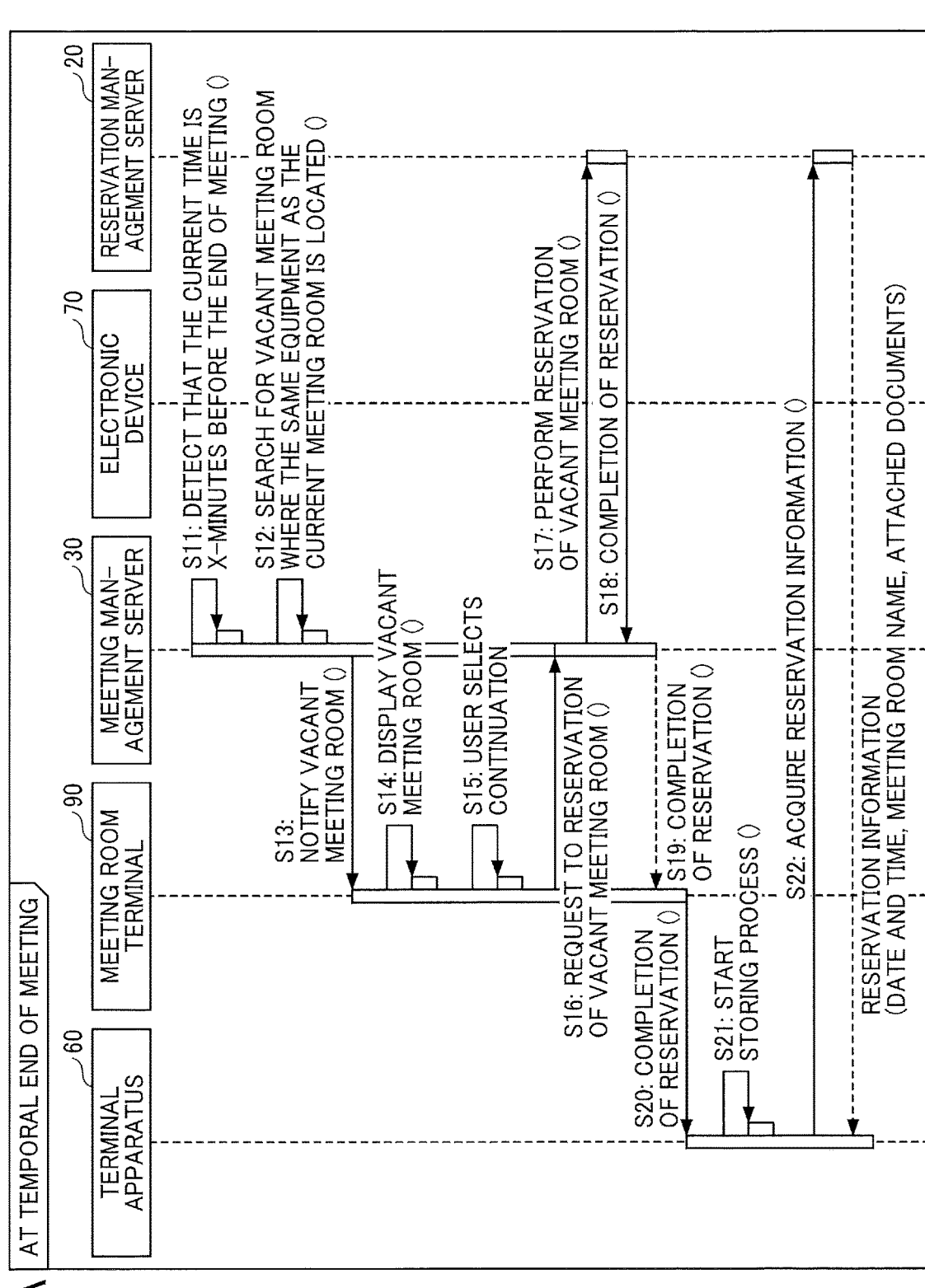
FIGS. 13A and 13B (FIG. 13) are sequence diagrams illustrating an example of an operation or processes performed by the facility reservation system when a user checks out, according to an embodiment of the present disclosure.
Figure 13B:
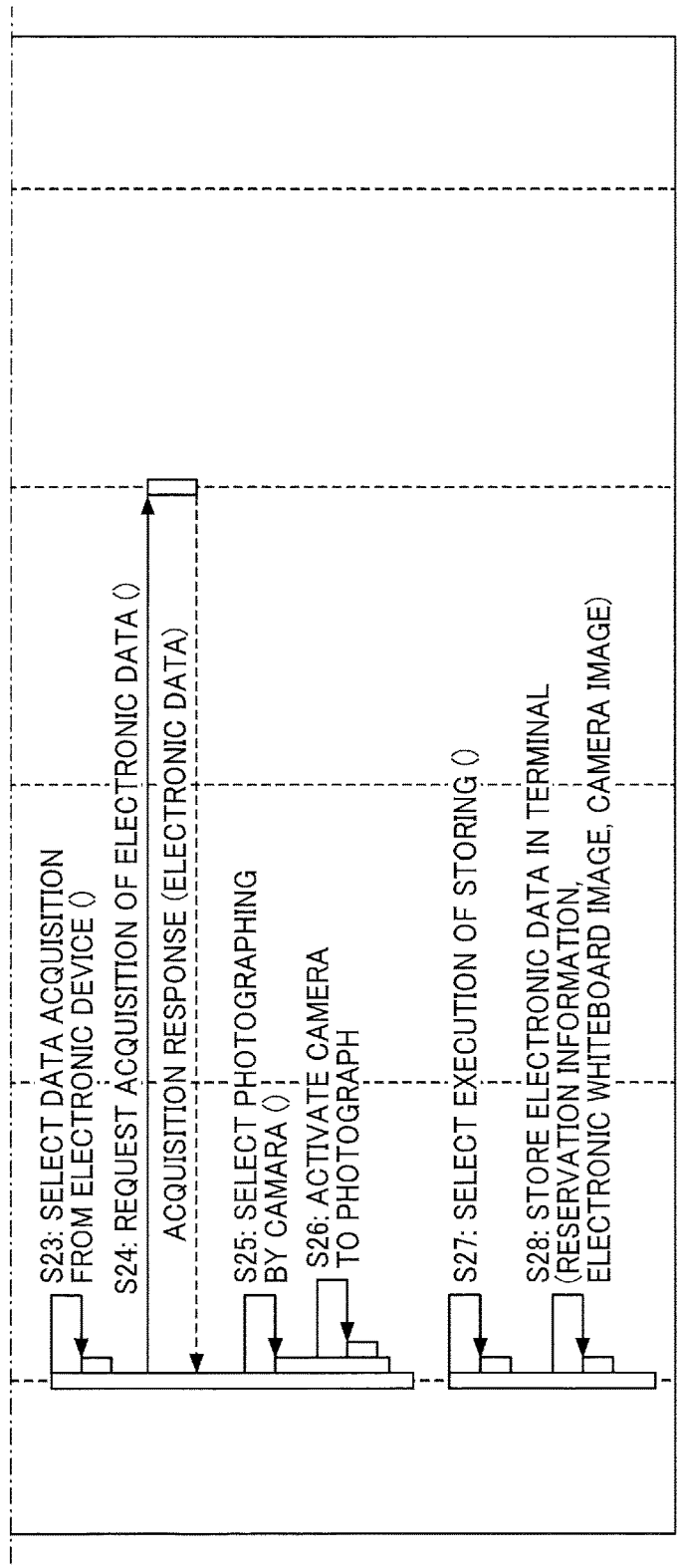

Operation and Processes at Check-Out:

FIGS. 13A and 13B (FIG. 13) are sequence diagrams illustrating an example of an operation or processes performed by the facility reservation system 100 when a user checks out. A description is given with reference FIGS. 13A and 13B on the assumption that the user has already checked in and a meeting has already started. An operation performed at the check-in is described below.

In step S11, when the user has not yet checked out (when the status in the meeting management information DB 493 is the "checked-in"), the proposal unit 41 of the meeting management server 30 determines whether a remaining time of the meeting is equal to or less than a predetermined time period.

In step S12, based on the determination result that the remaining time of the meeting is equal to or less than the predetermined time period, the proposal unit 41 searches the meeting management information DB 493 for vacant meeting rooms or transmits an inquiry to the reservation management server 20 for vacant meeting rooms. More specifically, a target of the search is meeting rooms that are vacant for a certain time (e.g., thirty minutes or more) after an end time of the currently conducted meeting. Preferably, the proposal unit 41 acquires the schedules of participants participating in the currently conducted meeting from the user schedule DB 292 and detects meeting rooms that are vacant during a time period during which all the participants are available.

The proposal unit 41 further detects, from the detected vacant rooms, one or more meeting rooms in which the same type of equipment (e.g., the electronic whiteboard) is provided as equipment that is provided in the meeting room in which the meeting is currently being conducted and having a size equal to or larger than that of the meeting room in which the meeting is currently being conducted. From the detected one or more vacant meeting rooms, the proposal unit 41 preferentially proposes a meeting room associated with a meeting whose start time is closer to the end time of the currently conducted meeting and located closer to the current meeting room.

For example, when no vacant meeting room is found in which the same type of equipment (e.g., the electronic whiteboard) is provided as equipment that is provided in the meeting room in which the meeting is currently being conducted and having a size equal to or larger than that of the meeting room in which the meeting is currently being conducted on the current day, the proposal unit 41 transmits a message that no vacant room is found to the meeting room terminal 90. In another example, any other suitable time other than the current day can be the search target, such as within one hour from the end time of the currently conducted meeting. In still another example, the user operates the meeting room terminal 90 to designate a desired time period as the search target.

In step S13, the transmission unit 31a of the meeting management server 30 transmits a list of vacant meeting rooms to the meeting room terminal 90.

Figure 14:
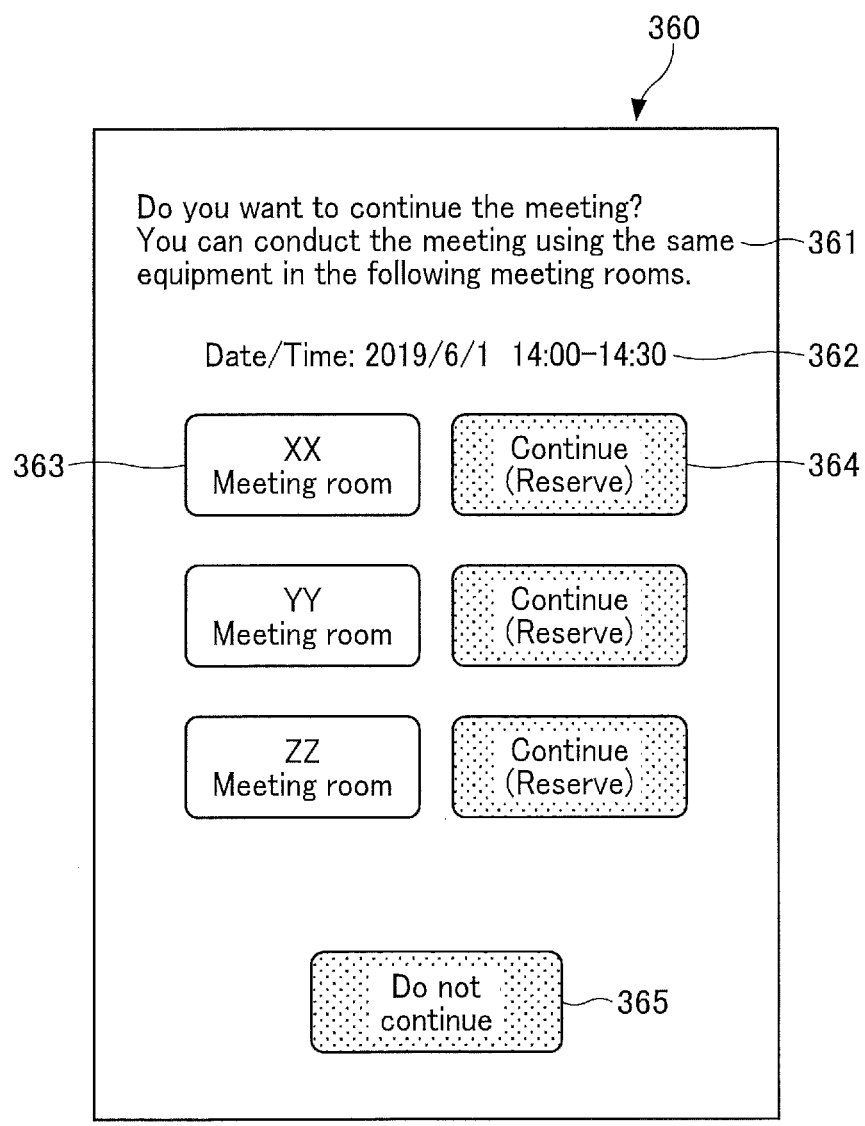
FIG. 14 is a diagram illustrating an example of a vacant meeting room list screen, according to an embodiment of the present disclosure.

In step S14, the communication unit 91 of the meeting room terminal 90 receives the list of vacant meeting rooms, and the display control unit 66 of the meeting application 60b displays a vacant meeting room list screen 360. An example of the vacant meeting room list screen 360 is illustrated in FIG. 14.

In step S15, when the user selects a desired meeting room on the vacant meeting room list screen 360, the operation reception unit 81 the user's selection.

In step S16, the server communication unit 65 of the meeting application 60b designates a meeting room ID and a meeting time and requests the meeting management server 30 to reserve the selected vacant room.

In step S17, the reception unit 31b of the meeting management server 30 receives the request for reservation of the vacant meeting room, and the reservation unit 42 requests the reservation management server 20 to reserve the meeting room.

In step S18, the reservation information management unit 22 of the reservation management server 20 reserves the meeting room identified by the meeting room ID for the meeting time. The communication unit 21 of the reservation management server 20 transmits a notification indicating the completion of reservation to the meeting management server 30.

In step S19, the reception unit 31b of the meeting management server 30 receives notification indicating the completion of reservation. The processes of steps S1.2 to S1.4 in FIG. 11 are performed, thereby a meeting identification information is assigned. The transmission unit 31a transmits the meeting identification information and the notification indicating the completion of reservation including the meeting ID, the meeting name, the start time, and the end time to the meeting room terminal 90.

In step S20, the terminal apparatus communication unit 92 of the meeting room terminal 90 transmits meeting identification information and the notification indicating the completion of reservation including the meeting room ID, the meeting room name, the start time, and the end time to the terminal apparatus 60 of the user. Communication between the meeting room terminal 90 and the terminal apparatus 60 is established by Bluetooth (registered trademark) or the like at the time of check-in. Thus, since the meeting room is reserved, the terminal apparatus 60 can start storing electronic data used in the meeting.

In step S21, the terminal communication unit 69 of the terminal apparatus 60 receives the meeting identification information and the notification indicating the completion of reservation including the meeting room ID, the meeting room name, the start time, and the end time, and the electronic data management unit 85 of the meeting application 60b starts a storing process of electronic data used in the meeting. Note that the user registers his or her own account in the meeting application 60b, and the meeting application 60b has a privilege to log in to the reservation management server 20 using this account to display or change schedule information of the user.

In another example, the meeting application 60b starts the storing process of electronic data used in the meeting in response to the user's selection of the desired meeting room, instead of starting the storing process of electronic data in response of the completion of reservation. This enables to start the storing process of electronic data earlier.

In still another example, the user manually activates the meeting application 60b to start the storing process electronic data. This allows the user to store electronic data used during use of the meeting room, even when the user does not extend the meeting.

In still another example, the server communication unit 65 of the meeting application 60b receives at least reservation information of the current time from the reservation management server 20 by the end of the meeting, and the meeting application 60b starts a process of step S21 and subsequent steps when the current time reaches a predetermined time before the end time of the current meeting. In still another example, the meeting application 60b starts the processes of step S21 and subsequent steps when the processes of step S21 and subsequent steps are not executed even after the end time of the current meeting. The meeting application 60b may display a dialog box indicating whether to start the storing processing and output any warning sound.

In response to the start of the storing process, in step S22, the resource information acquisition unit 82 designates the account of the user and communicates with the reservation management server 20 via the server communication unit 65, to acquire reservation information (the date and time, title, attached document) reserved by the user for the current time from the reservation management server 20. This process is omitted, when the resource information acquisition unit 82 has already received the reservation information for the current time.

The reservation management server 20 acquires reservation information in which the current time is included between the start time and the end time or reservation information whose end time is within a certain time period from the current time from the user schedule DB 292. For example, this certain time period is set by a user or a designer in advance.

resource information acquisition unit 82 acquires, from the reservation management server 20, reservation information whose meeting name is the same as or partially the same as the meeting name of the reservation information reserved by the user for the current time. In still another example, the resource information acquisition unit 82 acquires reservation information whose participants are the same or partially the same as the participants of the reservation information reserved by the user for the current time.

Such selection of the reservation information is performed either by the meeting application 60b or by the reservation management server 20.

When the resource information acquisition unit 82 receives information indicating that there is no corresponding reservation information from the reservation management server 20, the display control unit 66 displays information indicating that there is no corresponding information, to prompt the user to enter a date and time, a meeting name, and the like.

In another example, when there is no corresponding reservation information, the resource information acquisition unit 82 acquires N pieces of reservation information from the reservation management server in descending order of start time with respect to the current time. Thus, even when the user forgets to store electronic data at the end of a meeting, the electronic data is stored later in association with the reservation information. In this case, the electronic device 70 has a function of temporarily storing past electronic data that was not stored in the terminal apparatus 60 (was not transmitted to the terminal apparatus 60) in association with a date and time of a meeting, and displays a list of electronic data in association with the date and time. The user selects desired electronic data to be stored from the list.

Figure 15:
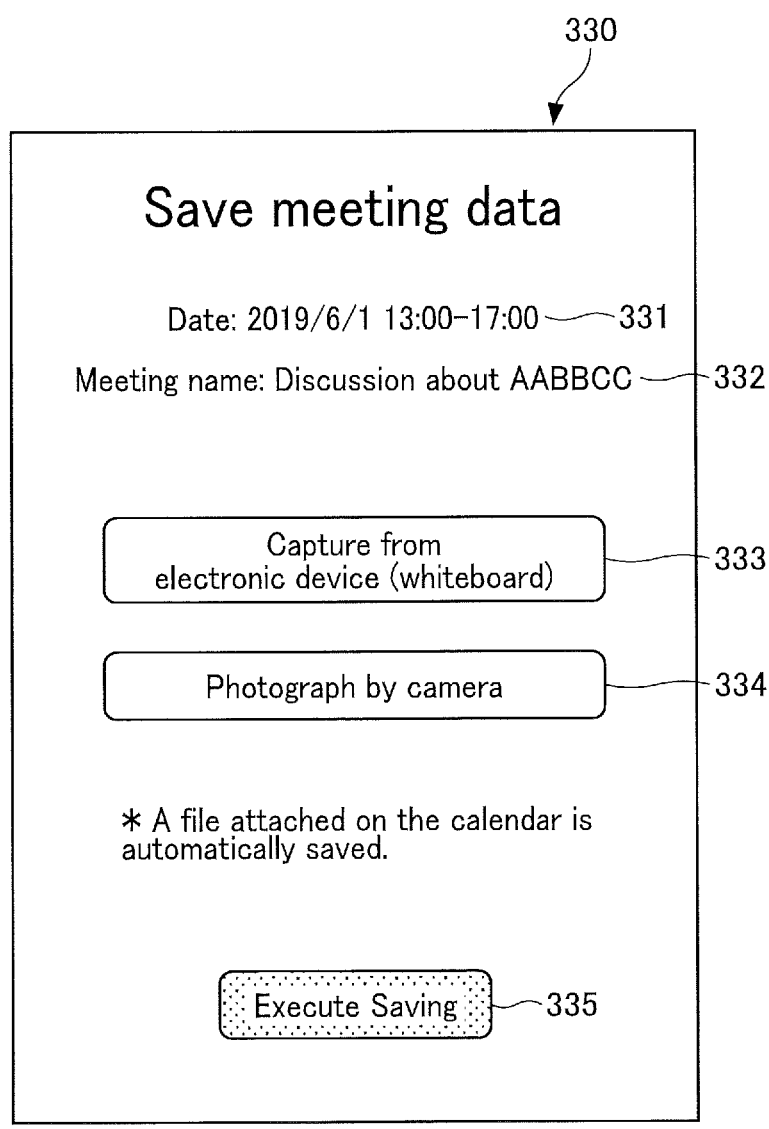
FIG. 15 is a diagram illustrating an example of an electronic data saving screen displayed by a meeting application of the terminal apparatus, according to an embodiment of the present disclosure.

The display control unit 66 of the meeting application displays an electronic data saving screen 330 using the reservation information. FIG. 15 is a diagram illustrating an example of the electronic data saving screen 330.

In step S23, when the user selects to acquire electronic data from the electronic device 70 on the electronic data saving screen 330, the operation reception unit 81 of the meeting application 60b receives the selection.

In this case, in step S24, the electronic data collection unit 83 of the meeting application 60b acquires electronic data used in the electronic device 70 from the electronic device 70 via the communication unit 68. The user inputs the SSID and the password displayed by the electronic device 70 to the meeting application 60b to connect the terminal apparatus 60 to the electronic device 70. The electronic data management unit 74 of the electronic device 70 acquires the electronic data used in the meeting from the electronic data storage unit 77 and transmits the acquired electronic data to the terminal apparatus 60 via the communication unit 71.

In step S25, when the terminal apparatus 60 or the electronic device 70 does not have a communication capability, or in order to photograph information other than the electronic data managed by the electronic device 70 with a camera and store the photographed information, the user selects photographing with the camera on the electronic data saving screen 330. The operation reception unit 81 of the meeting application 60b receives this user's selecting operation.

In step S26, the imaging unit 84 controls the CMOS sensor 713 to acquires an image of a subject as electronic data in response to pressing of a shutter button by the user.

In steps S27 and S28, in response to a save instruction input by the user to the meeting application 60b, the electronic data management unit 85 stores, in the electronic data DB 89, the electronic data acquired in steps S24 to S26 and the document (electronic data) attached to the reservation information acquired by the resource information acquisition unit 82 from the reservation management server 20 in association with the reservation information (including the event name such as the meeting name) acquired in step S22. In the process of storing the electronic data, the electronic data received from the electronic device 70, the electronic data photographed by the camera, and the electronic data (document) registered in the reservation management server 20 are distinguished from one another. Note that when the document registered in the reservation management server 20 is output from the electronic device 70, the document is categorized as electronic data received from the electronic device 70. Accordingly, a document on which handwritten characters and/or drawings are added as well as an original document are stored.

FIG. 14 is a diagram illustrating an example of the vacant meeting room list screen 360 displayed by the meeting room terminal 90. The vacant meeting room list screen 360 is a screen that displays a list of vacant meeting rooms. The vacant meeting room list screen 360 includes a message 361, a date and time 362, a meeting room name 363, a "Continue" button 364, and a "Do not continue" button 365. The message 361 indicates "Do you want to continue the meeting? You can conduct the meeting using the same equipment in the following meeting rooms." When the user wants to continue the meeting, the user selects a desired meeting room and presses the "Continue" button 364. For example, the meeting room names are displayed as being sorted in ascending order of a distance from the current meeting room. in another example, in a case in which the start time of the meeting differs depending on the meeting rooms, the meeting room names are displayed as being sorted by the closest start time. It is preferable that the user can select which of the distance and the start time is given priority in displaying the list of meeting rooms by the meeting room terminal 90.

FIG. 15 is a diagram illustrating an example of the electronic data saving screen 330 displayed by the meeting application 60b of the terminal apparatus 60. The electronic data saving screen 330 is a screen that receives an instruction indicating whether to store electronic data.

The electronic data saving screen 330 includes a date and time 331, a meeting name 332, a "capture from electronic whiteboard" button 333, a "photograph by camera" button 334, and a save execution button 335. The date and time 331 indicates a date and time of the reservation of the meeting room included in the reservation information acquired from the user schedule DB 292. The meeting name 332 indicates a meeting name included in the reservation information acquired form the user schedule DB 292. The "capture from electronic whiteboard" button 333 is a button that receives a user's operation for causing the meeting application 60b to acquire electronic data from the electronic device 70. The "photograph by camera" button 334 is a button that receives the user's operation for acquiring electronic data photographed by the camera by the meeting application 60b. The save execution button 335 is a button that receives the user's operation for saving electronic data in the electronic data DB 89.

Figure 16:
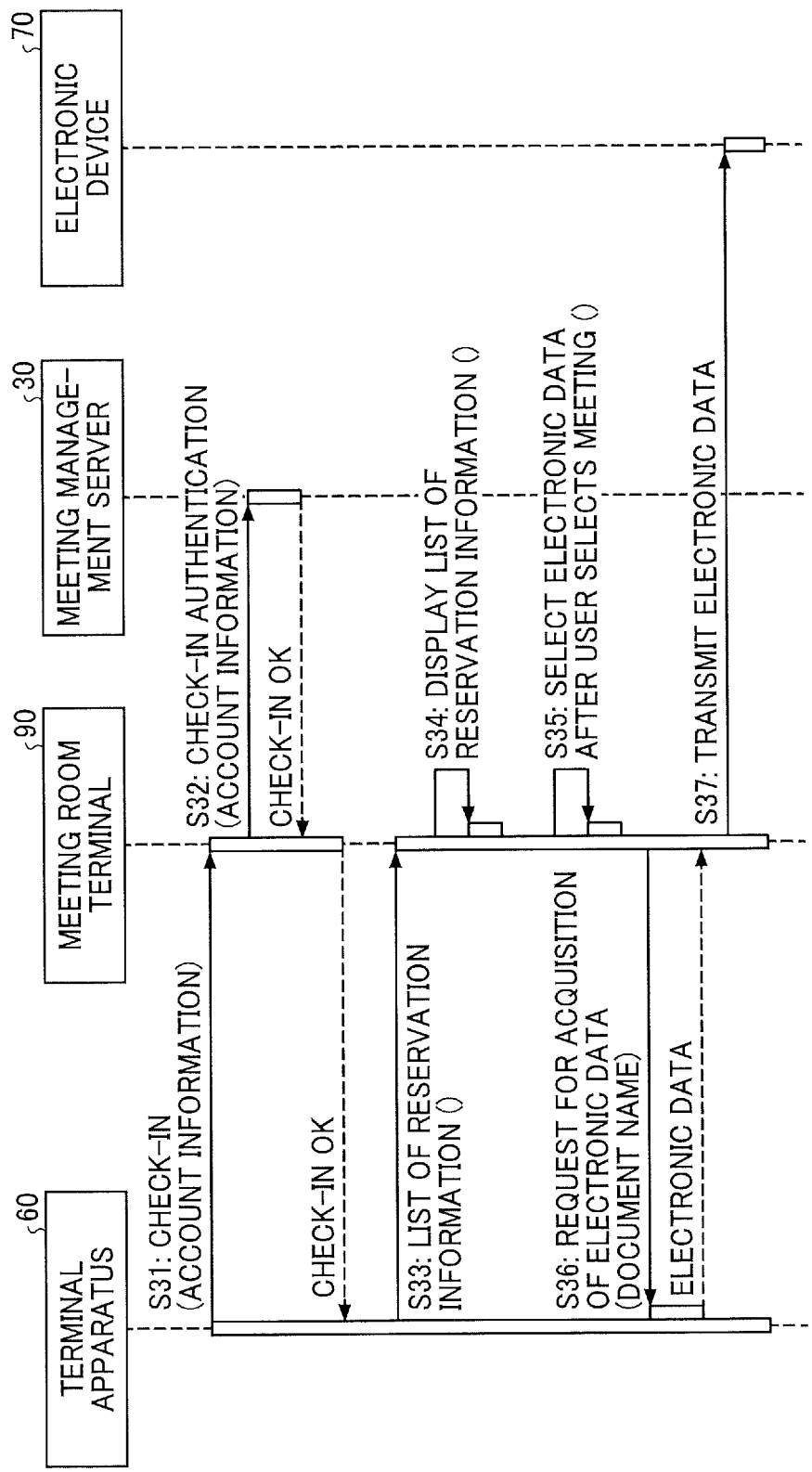
FIG. 16 is a sequence diagram illustrating an example of an operation or processes performed by the facility reservation system when the user checks in, according to an embodiment of the present disclosure.

Operation and Processes at Check-In:

A description is now given of an operation of displaying electronic data at the time of check-in by the electronic device 70 with reference to FIG. 16. FIG. 16 is a sequence diagram illustrating an example of the operation or processes performed by the facility reservation system 100 when the user checks in.

In step S31, a user who arrives at a meeting room that is reserved for extending the meeting checks in to the meeting room. When the terminal apparatus 60 transmits meeting identification information to the meeting room terminal 90 by short-range wireless communication to check in, the user activates the meeting application 60b to display a check-in screen. Note that the meeting application 60b holds the meeting identification information transmitted from the meeting room terminal 90. The meeting identification information may be displayed on the check-in screen. The terminal communication unit 69 receives a Bluetooth (registered trademark) advertising packet transmitted by the meeting room terminal 90, establishes a connection, and transmits the meeting identification information to the meeting room terminal 90. Note that Wi-Fi may be used for wireless communication.

In step S32, the terminal apparatus communication unit 92 of the meeting room terminal 90 receives the meeting identification information, and the communication unit 91 transmits a check-in request to the meeting management server 30 with designation of the reservation ID, the meeting room ID, and the meeting identification information. The reservation ID is an example of information on the reservation. The reservation information can be identified by the reservation ID. The meeting room ID is identification information of the meeting room for which the check-in operation was performed. The reservation information can also be identified by the meeting room ID and the current time.

The reception unit 31b of the meeting management server 30 receives the check-in request. In the following, a description is given on the assumption that the transmitted meeting identification information matches the meeting identification information stored in the meeting identification information DB 494. The usage management unit 38 permits the use of the meeting room. The transmission unit 31a of the meeting management server 30 transmits the check-in approval to the meeting room terminal 90, and the terminal apparatus communication unit 92 of the meeting room terminal 90 transmits the check-in approval (indicating that the use of the facility is started) to the meeting application.

When the check-in is denied, the display control unit 66 of the meeting application 60b displays information indicating that the check-in is denied, and the meeting application ends the operation of FIG. 16.

In another example, for the check-in, the user manually inputs the meeting identification information to the meeting room terminal 90. In this case, when the check-in is approved, the meeting room terminal 90 and the terminal apparatus 60 can start communication.

In step S33, when the terminal communication unit 69 receives the check-in approval, the electronic data management unit 85 of the meeting application 60b acquires a list of reservation information from the electronic data DB 89. The terminal communication unit 69 transmits the list of reservation information to the meeting room terminal 90. The list of reservation information is the same or substantially the same as the data of Table 12. In one example, the terminal communication unit 69 transmit all the pieces of reservation information. In another example, the terminal communication unit 69 transmits a list of N pieces of reservation information determined in advance in descending order of the date and time of the meetings.

Figure 17:
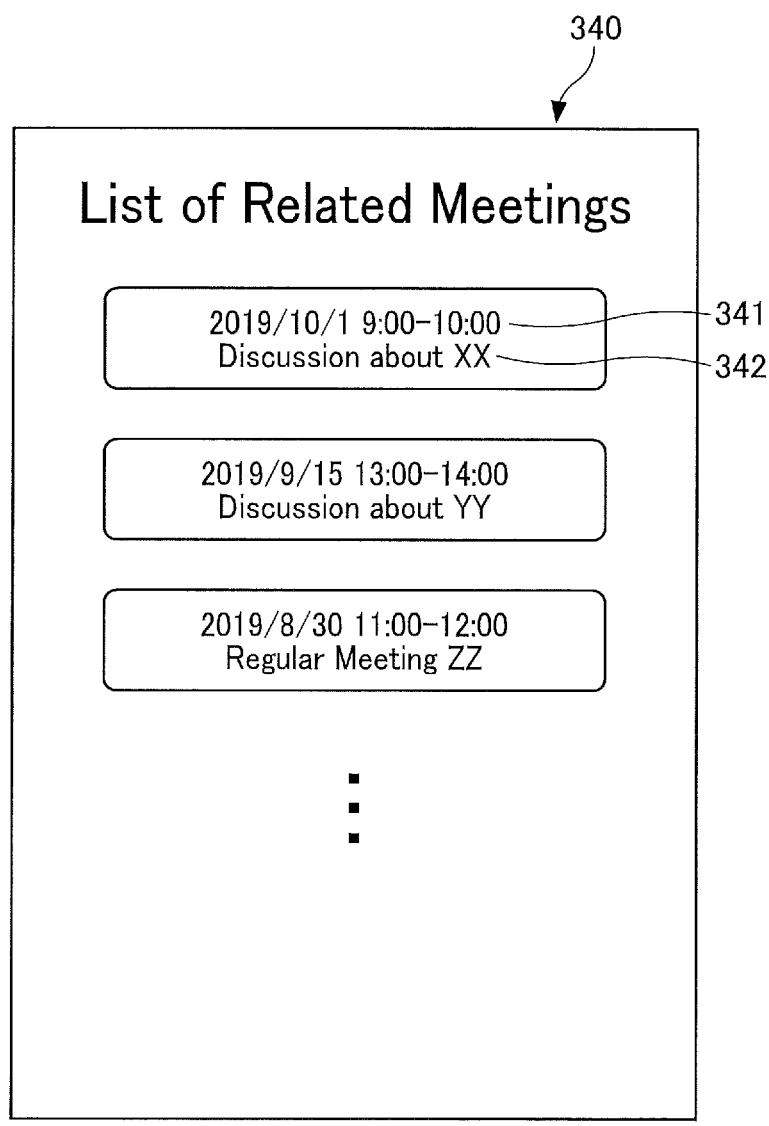
FIG. 17 is a diagram illustrating an example of a reservation information list screen displayed by the meeting room terminal, according to an embodiment of the present disclosure.

In step S34, the list acquisition unit 97 of the meeting room terminal 90 receives the list of reservation information via the terminal apparatus communication unit 92, and the display control unit 94 displays the list of reservation information. FIG. 17 illustrates an example of a reservation information list screen 340 displayed by the meeting room terminal 90. In another example, the reservation information list screen 340 of FIG. 17 is also be displayed by the terminal apparatus 60.

In step S35, on the reservation information list screen 340, the user selects desired reservation information associated with electronic data that the user wants to be displayed on the electronic device 70. The operation reception unit 93 of the meeting room terminal 90 receives the user's selection.

Figure 18:
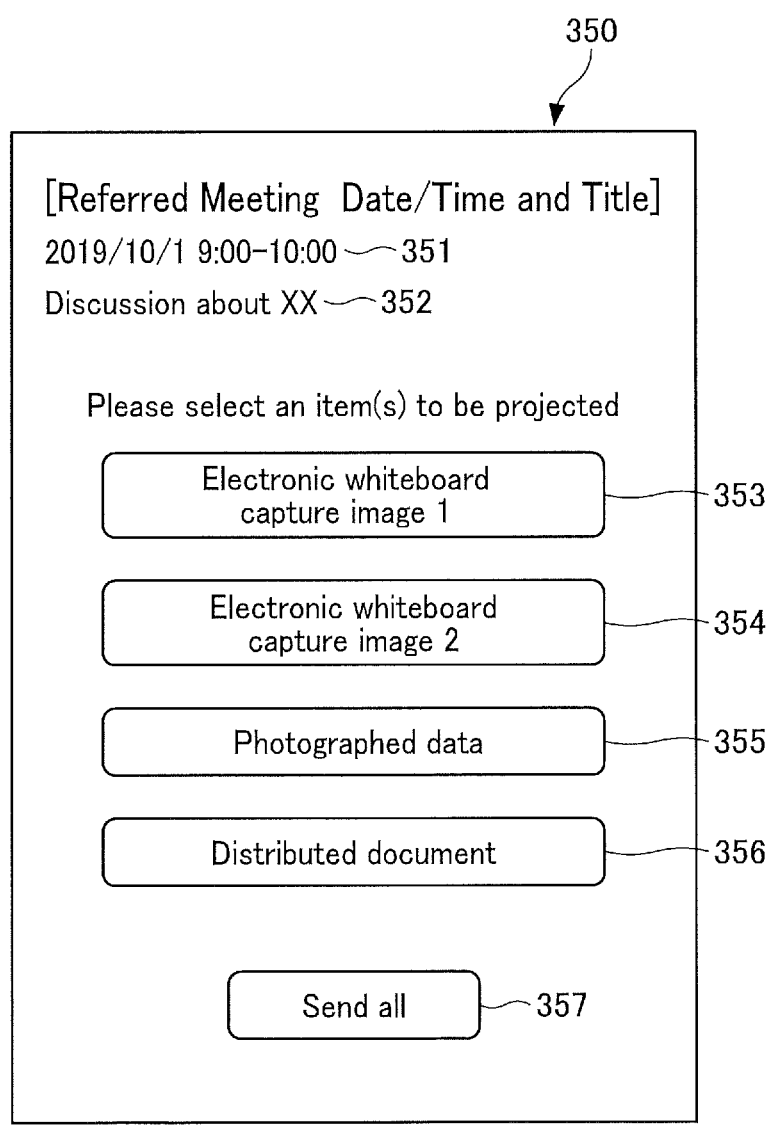
FIG. 18 is a diagram illustrating an example of an electronic data list screen displayed by the meeting room terminal, according to an embodiment of the present disclosure.

Further, the display control unit 94 of the meeting room terminal 90 displays an electronic data list screen 350 including a list of electronic data (such as file names of electronic data) associated with the selected reservation information. On the electronic data list screen 350, the user selects desired electronic data that the user wants to be displayed on the electronic device 70. The operation reception unit 93 receives the user's selection. FIG. 18 illustrates an example of the electronic data list screen 350 displayed by the meeting room terminal 90.

In step S36, the electronic data acquisition unit 98 transmits identification information (e.g., a document URL) of the electronic data selected by the user to the terminal apparatus 60 via the terminal apparatus communication unit 92. The terminal communication unit 69 of the meeting application receives the identification information of the electronic data, and the electronic data management unit 85 acquires the electronic data identified by the identification information of the electronic data from the terminal or the cloud storage. The terminal communication unit 69 of the meeting application transmits the electronic data and information indicating the electronic device 70 that outputs the electronic data to the meeting room terminal 90. In another example, the terminal communication unit 69 transmits information (e.g., the document URL) for displaying the electronic data to the meeting room terminal 90.

In step S37, the electronic data acquisition unit 98 of the meeting room terminal 90 receives the electronic data and the information indicating the electronic device 70 that outputs the electronic data via the terminal apparatus communication unit 92, and the electronic device communication unit 95 transmits the electronic data to the electronic device 70 of the same type as the electronic device that output the electronic data. When the electronic device 70 of the same type as the electronic device 70 that output the electronic data is not provided in the meeting room, the electronic device communication unit 95 may transmit the electronic data to the electronic device 70 provided in the meeting room. In this case, the electronic device communication unit 95 preferably converts the electronic data into electronic data in a general-purpose format such as a portable document format (PDF) file and transmits the converted electronic data.

In another example, the communication unit 68 of the meeting application 60b transmits the electronic data directly to the electronic device 70.

The communication unit 71 of the electronic device 70 receives the electronic data, and the electronic data display unit 73 controls the display to display the electronic data.

Although the description given above with reference FIG. 16 is of an example in which the electronic data selected by the user is transmitted from the terminal apparatus 60 to the meeting room terminal 90, in another example, the terminal apparatus 60 transmits all the electronic data associated with the meeting selected by the user to the meeting room terminal 90.

In still another example, the terminal apparatus 60 transmits all the electronic data used in the meeting to the meeting room terminal 90 in response to the approval of the check-in. In this case, it is preferable that a flag or the like is attached to the reservation information to indicate that the meeting is extended. In response to receiving the approval of the check-in, the terminal apparatus 60 transmits all the electronic data associated with the reservation information to which the flag is attached to the meeting room terminal 90. This is because the electronic data used in a meeting that is apparently extended may be transmitted without the user's selection.

As described heretofore, at the time of check-in, the user can cause the display to display an image or the like based on the electronic data used in the past meeting, by using the electronic device 70. The image may be an image relating to either a still image or a moving image.

When a meeting in which the electronic data used in the past meeting is used is ended, the terminal apparatus 60 executes the operation of FIG. 13 automatically or in response to a user's operation. In this case, the electronic data used in the past meeting is not stored in the terminal apparatus 60, and only the electronic data used in the current meeting is stored in the terminal apparatus 60. In another example, the electronic data used in the past meeting is also stored together with the electronic data used in the current meeting.

Example of Screen Displayed by Meeting Room Terminal:

FIG. 17 is a diagram illustrating an example of the reservation information list screen 340 displayed by the meeting room terminal 90. The reservation information list screen 340 displays a list of reservation information stored in the electronic data DB 89 electronic-data reservation of the terminal apparatus 60. As illustrated in FIG. 17, the reservation information list screen 340 includes a date and time 341 and a meeting name 342 for each meeting in which the user participated in the past. For example, the user selects a desired meeting relevant to a meeting in the user checks in. When the user selects the desired meeting, the screen transitions to the electronic data list screen 350 illustrated in FIG. 18.

The display control unit 66 of the meeting application 60b displays the list of the reservation information on the reservation information list screen 340 as follows, for example:
 displays the list of reservation information in descending order of a start time or an end time;
 displays the list of reservation information in descending order of the number of participants who are included in participants attending the meeting in which the user checks in;
 displays the list of reservation information with priority given to reservation information having a same start time and end time as that of the meeting in which the user checks in. This makes it easier for the user to select the relevant meeting. It is preferable that the user switches the display order of the list of the reservation information.

FIG. 18 is a diagram illustrating an example of the electronic data list screen 350 displayed by the meeting room terminal 90. The electronic data list screen 350 displays a list of electronic data that was used in a meeting. As illustrated in FIG. 18, the electronic data list screen 350 includes buttons such as a date and time 351 and a meeting name 352 of the meeting selected by the user, an image 353 and an image 354 captured by the electronic device 70, a photographed data 355, and a distributed document 356. The meeting room terminal 90 transmits a request for the electronic data selected by the user to the terminal apparatus 60.

In response to pressing of a "Send all" button 357 by the user, the meeting room terminal 90 transmits a request for all electronic data associated with the meeting selected by the user to the terminal apparatus 60.

In another example, on the electronic data list screen 350, the meeting room terminal 90 receives the electronic device 70 as a transmission destination to which the electronic data is to be transmitted. In this case, the meeting room terminal 90 acquires a type of the electronic device 70 provided in the meeting room from the storage unit 99 and accepts the electronic device 70 as the transmission destination for each electronic data.

In another example, the terminal apparatus 60 displays the reservation information list screen 340 of FIG. 17 and the electronic data list screen 350 of FIG. 18. Since the user only needs to operate the terminal apparatus 60, even when the meeting room terminal 90 provided in meeting room is far from the user, the user can cause the electronic device 70 to display desired electronic data while sitting.

A technique is known in which file data used for displaying information represented by the file data on a display during use of a meeting room is reproduced in a different meeting. Further, a system using such technique is known that acquires shared folder information from a user identifier (ID) transmitted from an integrated circuit (IC) card or the like and reproduces the file data even when a different user uses the system.

However, there was a drawback that a terminal apparatus cannot start processing of storing electronic data that is output during a use of a resource for a meeting or the like. For example, when the terminal apparatus stores electronic data that is output in the meeting, the terminal apparatus displays the electronic data on an electronic device located in a meeting room in the next meeting. However, an operation for storing the electronic data that is output during the meeting in the terminal apparatus places a heavy burden on a user.

According to one or more embodiments of the present disclosure, a method is provided according to which a terminal apparatus starts storing electronic data that is output during a use of a resource for a meeting or the like.

Variations:

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

For example, a plurality of meeting management servers 30 can be provided, or the functions of the meeting management server 30 can be distributed to a plurality of servers.

The reservation management server 20 and the meeting management server 30 can be implemented by a single entity.

The apparatuses or devices described in the present embodiment are merely one example of plural computing environments that implement one or more embodiments disclosed herein. In some embodiments, the meeting management server 30 includes multiple computing devices, such as a server cluster. The plural computing devices are configured to communicate with one another through any type of communication link including a network, shared memory, etc., and perform the processes described in this disclosure.

The facility reservation system 100 of the present embodiment can also be referred to as a "web service". The web service refers to various services provided by the internet-related technologies. Examples of the web service include various rental services including a meeting room rental service. A system that uses the service is called a usage system.

In addition, the functional configuration of the facility reservation system 100 are divided into the functional blocks as illustrated in FIGS. 6A and 6B (FIG. 6), FIGS. 7A and 7B (FIG. 7), and FIG. 10, for example, based on main functions thereof, in order to facilitate understanding the processes performed by the facility reservation system 100. No limitation is intended by how the processes are divided or by the names of the processes. The facility reservation system 100 can also be divided into the larger number of units according to the processing contents. Further, one process can be divided to include the larger number of processes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A method of storing electronic data performed by a terminal apparatus communicable with an information processing apparatus and an information processing terminal that are communicable with each other, the method comprising:
   determining whether a remaining time for a use of a first resource is equal to or less than a predetermined time period by the information processing apparatus;
   based on a determination result that the remaining time is equal to or less than the predetermined time period, searching available resources;
   creating a list of available resources for preferentially proposing a second resource based on a type, a size or a time for use of the resource from the available resources searched;
   transmitting the list of available resources to the information processing terminal;
   receiving, during the use of the first resource, a notification indicating that reservation of the second resource selected from the list of available resources by a user is completed, from the information processing terminal;
   in response to receiving the notification indicating that the reservation of the second resource is completed, starting a storing process of storing electronic data output by an electronic device during the use of the first resource;

displaying an electronic data saving screen configured to receive a selection by the user whether to acquire the electronic data output by the electronic device from the electronic device or to photograph the electronic data output by the electronic device with a camera;

in a case where the user selects, on the electronic data saving screen, to acquire the electronic data from the electronic device, acquiring the electronic data by wireless communication;

in a case where the user selects, on the electronic data saving screen, to photograph the electronic data with the camera, acquiring the electronic data by photographing with the camera;

storing the acquired electronic data in the terminal apparatus in association with reservation information, the reservation information being configured such that a flag is attached thereto in a case where an event in the first resource has been extended; and in response to receiving a notification indicating that a use of the second resource is started, from the information processing terminal located at the second resource, causing the terminal apparatus to transmit the electronic data, stored in association with the reservation information to which the flag is attached, to the information processing terminal without a selection by the user.

2. The method of claim 1, further comprising:

acquiring the reservation information from the information processing apparatus in which the reservation information is registered via a network; and storing in a memory of the terminal apparatus the electronic data in association with the acquired reservation information including an event name.

3. The method of claim 2, further comprising displaying the electronic data saving screen together with the event name included in the acquired reservation information.

4. The method of claim 1, further comprising storing the electronic data output by the electronic device during the use of the first resource in a cloud storage.

5. A resource reservation system comprising:

an information processing terminal including first circuitry;

a terminal apparatus being communicable with the information processing terminal and including second circuitry; and an information processing apparatus being communicable with the information processing terminal and the terminal apparatus, and including third circuitry configured to determine whether a remaining time for a use of a first resource is equal to or less than a predetermined time period, based on a determination result that the remaining time is equal to or less than the predetermined time period, search available resources, create a list of available resources for preferentially proposing a second resource based on a type, a size or a time for use of the resource from the available resources searched, and transmit the list of available resources to the information processing terminal, the second circuitry of the terminal apparatus being configured to receive, during the use of the first resource, a notification indicating that reservation of the second resource selected from the list of available resources by a user is completed, from the information processing terminal, in response to receiving the notification indicating that the reservation of the second resource is completed, store in a memory of the terminal apparatus electronic data output by a first electronic device during the use of the first resource in association with reservation information of the first resource, display an electronic data saving screen configured to receive a selection by the user whether to acquire the electronic data output by the first electronic device from the first electronic device or to photograph the electronic data output by the first electronic device with a camera, in a case where the user selects, on the electronic data saving screen, to acquire the electronic data from the first electronic device, acquire the electronic data by wireless communication, in a case where the user selects, on the electronic data saving screen, to photograph the electronic data with the camera, acquire the electronic data by photographing with the camera, store the acquired electronic data in the terminal apparatus in association with the reservation information, the reservation information being configured such that a flag is attached thereto in a case where an event in the first resource has been extended, and in response to receiving a notification indicating that a use of the second resource is started, from the information processing terminal located at the second resource, cause the terminal apparatus to transmit the electronic data, stored in association with the reservation information to which the flag is attached, to the information processing terminal without a selection by the user, and the first circuitry of the information processing terminal being configured to transmit the electronic data received from the terminal apparatus to a second electronic device provided at the second resource.

6. The resource reservation system of claim 5, wherein the first circuitry of the information processing terminal is further configured to display the list of available resources transmitted from the information processing apparatus, and request the information processing apparatus to make a reservation for the second resource selected by the user from the list.

7. The resource reservation system of claim 6, wherein the third circuitry of the information processing apparatus is further configured to propose the second resource in which a same type of equipment is provided as equipment provided at the first resource.

8. The resource reservation system of claim 6, wherein the third circuitry of the information processing apparatus is further configured to propose the second resource in which a same type of equipment is provided as equipment provided at the first resource in ascending order of a distance from the first resource, and wherein the first circuitry of the information processing terminal is further configured to display the list of the available resources transmitted from the information processing apparatus in ascending order of the distance from the first resource.

9. A terminal apparatus being communicable with an information processing apparatus and an information processing terminal that are communicable with each other, the information processing apparatus being configured to determine whether a remaining time for a use of a first resource is equal to or less than a predetermined time period, search available resources based on a determination result that the remaining time is equal to or less than the predetermined time period, create a list of available resources for preferentially proposing a second resource based on a type, a size or a time for use of the resource from the available resources searched, and transmit the list of available resources to the information processing terminal, the terminal apparatus comprising circuitry configured to:

receive, during the use of the first resource, a notification indicating that reservation of the second resource selected from the list of available resources by a user is completed, from the information processing terminal;

in response to receiving the notification indicating that the reservation of the second resource is completed, starting a storing process of storing electronic data output by an electronic device during the use of the first resource;

display an electronic data saving screen configured to receive a selection by the user whether to acquire the electronic data output by the electronic device from the electronic device or to photograph the electronic data output by the electronic device with a camera;

in a case where the user selects, on the electronic data saving screen, to acquire the electronic data from the electronic device, acquire the electronic data by wireless communication;

in a case where the user selects, on the electronic data saving screen, to photograph the electronic data with the camera, acquire the electronic data by photographing with the camera;

store the acquired electronic data in the terminal apparatus in association with reservation information, the reservation information being configured such that a flag is attached thereto in a case where an event in the first resource has been extended; and in response to receiving a notification indicating that a use of the second resource is started, from the information processing terminal located at the second resource, cause the terminal apparatus to transmit the electronic data, stored in association with the reservation information to which the flag is attached, to the information processing terminal without a selection by the user.

10. The terminal apparatus of claim 9, wherein the circuitry is further configured to acquire the reservation information from the information processing apparatus in which the reservation information is registered via a network, and store in a memory of the terminal apparatus the electronic data in association with the acquired reservation information including an event name.

11. The terminal apparatus of claim 10, wherein the circuitry is further configured to display the electronic data saving screen together with the event name included in the acquired reservation information.

12. The terminal apparatus of claim 9, wherein the circuitry is further configured to store the electronic data output by the electronic device during the use of the first resource in a cloud storage.

* * * * *